United States Patent
Cai et al.

(10) Patent No.: US 10,368,150 B1
(45) Date of Patent: Jul. 30, 2019

(54) CARRYING HIGH CAPACITY BIT TRANSPARENT LEASED LINE SERVICES OVER INTERNET PROTOCOL/MULTIPROTOCOL LABEL SWITCHING NETWORKS

(71) Applicant: Fujitsu Limited, Kanagawa (JP)

(72) Inventors: Biaodong Cai, San Ramon, CA (US);
Rod Naphan, McKinney, TX (US);
Richard Dunsmore, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/125,122

(22) Filed: Sep. 7, 2018

(51) Int. Cl.
| | |
|---|---|
| *H04B 10/00* | (2013.01) |
| *H04Q 11/00* | (2006.01) |
| *H04L 29/06* | (2006.01) |
| *H04L 12/723* | (2013.01) |
| *H04J 3/16* | (2006.01) |
| *H04J 14/00* | (2006.01) |

(52) U.S. Cl.
CPC ........ *H04Q 11/0005* (2013.01); *H04J 3/1658* (2013.01); *H04L 45/50* (2013.01); *H04L 69/164* (2013.01); *H04Q 11/0062* (2013.01); *H04J 2203/0023* (2013.01); *H04Q 2011/0045* (2013.01); *H04Q 2011/0077* (2013.01); *H04Q 2011/0088* (2013.01)

(58) Field of Classification Search
CPC .... H04J 14/0267; H04L 45/566; H04L 45/60; H04L 49/1523; H04Q 11/0005; H04Q 11/0066; H04Q 11/0071
See application file for complete search history.

(56) References Cited

U.S. PATENT DOCUMENTS

| | | | |
|---|---|---|---|
| 2016/0028586 A1* | 1/2016 | Blair | H04B 10/27 398/45 |
| 2017/0310413 A1* | 10/2017 | Cai | H04L 45/745 |

OTHER PUBLICATIONS

International Telecommunication Union, "Interfaces for the Optical Transport Network" ITU-T G.709/Y.1331 (Jun. 2016); 244 pages.
International Telecommunication Union, "Architecture of Optical Transport Networks" ITU-T G.872 (Jan. 2017); 68 pages.
Riegel. "Requirements for Edge-to-Edge Emulation of Time Division Multiplexed (TDM) Circuits over Packet Switching Networks", IETF, RFC 4197, Oct. 2005; 24 pages.
Vainshtein, et al. "Structure-Agnostic Time Division Multiplexing (TDM) over Packet (SAToP)." IETF, RFC 4553, Jun. 2006; 27 pages.

(Continued)

Primary Examiner — Daniel G Dobson
(74) *Attorney, Agent, or Firm* — Baker Botts L.L.P.

(57) ABSTRACT

Methods and systems of a leased line appliance (LLA) network switching system that includes using LLAs for leased line circuits (LLCs) to Internet Protocol (IP) transceiving, IP to LLCs transceiving, and an IP switch fabric having multiple parallel paths as a switching/routing network are disclosed. Each of the LLAs at the edge of the IP switch fabric may perform LLC to IP packet assembly procedures, may perform IP packet to LLC re-assembly procedures, and may utilize the protocol fields of the IP packet header of the IP packet for IP packet transport, which may enable the transport of very high speed leased line services to be carried over an IP/MPLS network using the IP switch fabric.

20 Claims, 9 Drawing Sheets

(56) References Cited

OTHER PUBLICATIONS

Malis, et al. "Synchronous Optical Network/Synchronous Digital Hierarchy (SONET/SDH) Circuit Emulation over Packet (CEP)." IETF, RFC 4842, Apr. 2007; 43 pages.

MEF 8. "Implementation Agreement for the Emulation of PDH Circuits over Metro Ethernet Networks." Metro Ethernet Forum, Oct. 2004; 34 pages.

* cited by examiner

> US 10,368,150 B1

CARRYING HIGH CAPACITY BIT TRANSPARENT LEASED LINE SERVICES OVER INTERNET PROTOCOL/MULTIPROTOCOL LABEL SWITCHING NETWORKS

BACKGROUND

Field of the Disclosure

The present disclosure relates generally to communication networks and, more particularly, to carrying high capacity bit transparent leased line services over Internet Protocol/Multi-Protocol Label Switching (IP/MPLS) networks.

Description of the Related Art

Telecommunication, cable television, video and movie streaming, and data communication systems use Internet Protocol/Multi-Protocol Label Switching (IP/MPLS) networks, time-division multiplexing (TDM) and wavelength-division multiplexing (WDM) networks, for example, optical transport networks (OTN) and synchronous optical networks (SONET), to rapidly convey large amounts of information between remote points. Most of today's wide area communication and networking traffic are carried over IP/MPLS networks. Wide area communication and network traffic may include, for example, Facebook social media data, YouTube® video streaming, Netflix® movie streaming, email, and webpage and website communication. Telecommunication and network carriers provide leased line services to enterprise customers and other service providers using dedicated TDM and WDM networks, OTNs, and SONETs. Lease line services may be provided for security, traffic segregation, service level agreements (SLAs), regulatory, or other reasons. In leased line services, the emphasis is on carrying client signals bit transparently over a carrier's network. To carry client signals bit transparently, every bit transferred from a client through its user-network interface (UNI) at an ingress side of the carrier's network shall be faithfully carried over the carrier's network and transferred to the client at the remote, egress side of carrier's network, bit-by-bit, in the client signals original order, no more, no less. In addition, the carrier shall not examine the structure and the contents of the client signals. While leased line traffic represents a relatively small percentage of the total wide area communication and networking traffic overall, the leased line services are considered premium services and are very lucrative for the carriers.

IP/MPLS networks, TDM and WDM networks, OTNs, and SONET networks may be configured to transmit information between these networks. Typically, IP network switches and routers are used to transport multiple IP packets over an IP network using multiple standardized IP protocols and IP/MPLS routing functions. In addition, typically, an OTN switch is used to centrally perform electrical switching of the sub-channels carried within an optical signal to different destinations. Furthermore, typically, a SONET switch is used to transport multiple digital bit streams over fiber using multiple standardized multiplexing protocols.

SUMMARY

In one embodiment, a disclosed leased line appliance (LLA) network switching system may include an Internet Protocol (IP) switch fabric including M parallel paths, a first LLA coupled to a first set of leased lines and coupled to the IP switch fabric. The first LLA may receive first leased line circuits (LLCs) over a first leased line of the first set of leased lines. The first LLA may also convert the first LLCs to first optical data unit (ODU) cells. The first LLA may further map the first ODU cells into first Internet Protocol (IP) packets using user datagram protocol (UDP), each of the first IP packets having a corresponding header comprising a UDP source port number including an ODU identification (ID) source, a UDP destination port number including an ODU ID destination, a sequence number, and a timestamp. The first LLA may also transmit each of the first IP packets over the IP switch fabric via a respective parallel path of the M parallel paths corresponding to each of the first IP packets. The LLA network switching system may also include a second LLA coupled to a second set of leased lines and coupled to the IP switch fabric. The second LLA may receive each of the first IP packets over the IP switch fabric via the parallel path of the M parallel paths corresponding to each of the first IP packets. The second LLA may also de-map the first IP packets into the first ODU cells based on each corresponding header of each of the first IP packets. The second LLA may further convert the first ODU cells to the first LLCs. The second LLA may also transmit the first LLCs over a second leased line of the second set of leased lines.

In a number of the disclosed embodiments of the LLA network switching system, the first LLA may also receive second LLCs over a third leased line of the first set of leased lines. The first LLA may further convert the second LLCs to second physical coding sublayer (PCS) blocks. The first LLA may also map the second PCS code blocks into second IP packets using UDP, each of the second IP packets having a corresponding header comprising a UDP source port number including a PCS code block ID source, a UDP destination port number including a PCS code block ID destination, a sequence number, and a timestamp. The first LLA may further transmit each of the second IP packets over the IP switch fabric via the parallel path of the M parallel paths corresponding to each of the second IP packets. The second LLA may also receive each of the second IP packets over the IP switch fabric via the parallel path of the M parallel paths corresponding to each of the second IP packets. The second LLA may further de-map the second IP packets into the second PCS code blocks based on each corresponding header of each of the second IP packets. The second LLA may also convert the second ODU cells to the second LLCs and transmit the second LLCs over a fourth leased line of the second set of leased lines.

In a number of the disclosed embodiments of the LLA network switching system, the first LLA may also receive third LLCs over a fifth leased line of the first set of leased lines, multiplex the third LLCs into third synchronous transport signal (STS) circuits, convert the third STS circuits to third ODU cells, and map the third ODU cells into third IP packets using UDP, each of the third IP packets having a having a corresponding header comprising a UDP source port number including a PCS code block ID source, a UDP destination port number including a PCS code block ID destination, a sequence number, and a timestamp. The first LLA may further transmit each of the third IP packets over the IP switch fabric via the parallel path of the M parallel paths corresponding to each of the third IP packets. The second LLA may also receive each of the third IP packets over the IP switch fabric via the parallel path of the M parallel paths corresponding to each of the third IP packets, de-map the third IP packets into the third ODU cells based on each corresponding header of each of the third IP packets, convert the third ODU cells to the third STS circuits, de-multiplex the third STS circuits into third LLCs, and transmit the third LLCs over a sixth leased line of the second set of leased lines.

In a number of the disclosed embodiments of the LLA network switching system, the first LLA may also, prior to the transmission of each of the first IP packets over the IP switch fabric, generate parity information for the first ODU cells in every M−1 IP packets of the first IP packets using exclusive or (XOR) operations that is included in a corresponding Mth IP packet of the first IP packets to utilize 1:(M−1) path protection. The UDP source port number of the corresponding header of each of the first IP packets may include a parallel path number associated with a parallel path of the M parallel paths. The second LLA may also, prior to the de-map of the first IP packets into the first ODU cells, determine whether the M−1 IP packets of the first IP packets and the Mth IP packet of the first IP packets including the parity information for the first ODU cells have been received and when only M−2 IP packets of the first IP packets and the Mth IP packet of the first IP packets have been received, recover a lost IP packet of the M−1 IP packets from the M−2 IP packets and the parity information received using XOR operations.

In a number of the disclosed embodiments of the LLA network switching system, the first LLA may also perform a time of day synchronization process to synchronize a first time of day clock of the first LLA with an Internet time of day clock of the LLA network switching system. The first LLA may further, prior to the transmission of each of the first IP packets over the IP switch fabric, adjust the timestamp of the corresponding header of each of the first IP packets based on the synchronized first time of day clock. The second LLA may perform the time of day synchronization process to synchronize a second time of day clock of the second LLA with the Internet time of day clock of the LLA network switching system.

In a number of the disclosed embodiments of the LLA network switching system, the first LLA may also perform a time of day synchronization process to synchronize a first time of day clock of the first LLA with an Internet time of day clock of the LLA network switching system. The first LLA may further, prior to the transmission of each of the first IP packets over the IP switch fabric set each of first path latency measurements based on the first time of day clock, transmit each of the first path latency measurements to the second LLA via a respective one of the M parallel paths of the IP switch fabric, and receive a round robin order of M parallel path queues from the second LLA, each of the M parallel path queues corresponding to the respective one of the M parallel paths. The transmission of each of the first IP packets over the IP switch fabric may further be based on the round robin order of the M parallel path queues. The second LLA may also perform the time of day synchronization process to synchronize a second time of day clock of the second LLA with the Internet time of day clock of the LLA network switching system, determine a low 10 time value and a high 90 time value of each respective one of the M parallel paths based on the first path latency measurements and the second time of day clock, sort the M parallel path queues in the round robin order of the low 10 time value of each respective one of the M parallel paths with the lowest low 10 time value being the first in the round robin order, set a watermark time value for the M parallel path queues as the highest high 90 time value of each respective one of the M parallel paths, and transmit the round robin order of the M parallel path queues to the first LLA.

In a number of the disclosed embodiments of the LLA network switching system, the reception of each of the first IP packets over the IP switch fabric may be further based on the round robin order of the M parallel path queues. The second LLA may also, prior to the de-map of the first IP packets into the first ODU cells, re-sequence each of the first IP packets received in the round robin order into a re-sequence queue in a re-sequenced placement order based on each sequence number and timestamp of each corresponding header of each of the first IP packets. The de-map of the first IP packets may be de-mapped in the re-sequenced order.

In a number of the disclosed embodiments of the LLA network switching system, the watermark time value may be used to begin the re-sequence of each of the first IP packets received in the round robin order into the re-sequence queue.

In a number of the disclosed embodiments of the LLA network switching system, the first LLA may also, when a confirmation that one of the M parallel paths failed is received, utilize 1:(M−2) path protection and the M−1 working parallel paths for IP packet transmission and IP packet reception. The second LLA may also, when the confirmation that one of the M parallel paths failed is received, utilize 1:(M−2) path protection and the M−1 working parallel paths for IP packet transmission and IP packet reception.

In a number of the disclosed embodiments of the LLA network switching system, a protocol of UDP, a IP source address, a IP destination address, the UDP source port number, and the UDP destination port number of the corresponding header of each of the first IP packets may enable 5-Tuple inspection based equal cost multi-path routing over the IP switch fabric.

In a second embodiment, a disclosed method may include receiving, by a first leased line appliance (LLA) of a LLA network switching system, first leased line circuits (LLCs) over a first leased line of a first set of leased lines of the LLA network switching system. The method may also include converting, by the first LLA, the first LLCs to first optical data unit (ODU) cells. The method may further include mapping, by the first LLA, the first ODU cells into first Internet Protocol (IP) packets using user datagram protocol (UDP), each of the first IP packets having a corresponding header comprising a UDP source port number including an ODU identification (ID) source, a UDP destination port number including an ODU ID destination, a sequence number, and a timestamp. The method may also include transmitting, by the first LLA, each of the first IP packets over an IP switch fabric of the LLA network switching system via a respective parallel path of M parallel paths of the IP switch fabric corresponding to each of the first IP packets. The method may further include receiving, by a second LLA of the LLA network switching system, each of the first IP packets over the IP switch fabric via the parallel path of the M parallel paths corresponding to each of the first IP packets. The method may also include de-mapping, by the second LLA, the first IP packets into the first ODU cells based on each corresponding header of each of the first IP packets. The method may further include converting, by the second LLA, the first ODU cells to the first LLCs. The method may also include transmitting, by the second LLA, the first LLCs over a second leased line of a second set of leased lines of the LLA network switching system.

In a number of the disclosed embodiments of the method, the method may also include receiving, by the first LLA, second LLCs over a third leased line of the first set of leased lines, converting, by the first LLA, the second LLCs to second physical coding sublayer (PCS) blocks, and mapping, by the first LLA, the second PCS code blocks into second IP packets using UDP, each of the second IP packets having a corresponding header comprising a UDP source port number including a PCS code block ID source, a UDP destination port number including a PCS code block ID destination, a sequence number, and a timestamp. The method may further include transmitting, by the first LLA, each of the second IP packets over the IP switch fabric via the parallel path of the M parallel paths corresponding to each of the second IP packets, receiving, by the second LLA, each of the second IP packets over the IP switch fabric via the parallel path of the M parallel paths corresponding to each of the second IP packets, de-mapping, by the second LLA, the second IP packets into the second PCS code blocks based on each corresponding header of each of the second IP packets, converting, by the second LLA, the second ODU cells to the second LLCs, and transmitting, by the second LLA, the second LLCs over a fourth leased line of the second set of leased lines.

In a number of the disclosed embodiments of the method, the method may also include receiving, by the first LLA, third LLCs over a fifth leased line of the first set of leased lines, multiplexing, by the first LLA, the third LLCs into third synchronous transport signal (STS) circuits, converting, by the first LLA, the third STS circuits to third ODU cells, and mapping, by the first LLA, the third ODU cells into third IP packets using UDP, each of the third IP packets having a corresponding header comprising a UDP source port number including a PCS code block ID source, a UDP destination port number including a PCS code block ID destination, a sequence number, and a timestamp. The method may further include transmitting, by the first LLA, each of the third IP packets over the IP switch fabric via the parallel path of the M parallel paths corresponding to each of the third IP packets, receiving, by the second LLA, each of the third IP packets over the IP switch fabric via the parallel path of the M parallel paths corresponding to each of the third IP packets, de-mapping, by the second LLA, the third IP packets into the third ODU cells based on each corresponding header of each of the third IP packets, converting, by the second LLA, the third ODU cells to the third STS circuits, de-multiplexing, by the second LLA, the third STS circuits into third LLCs, and transmitting, by the second LLA, the third LLCs over a sixth leased line of the second set of leased lines.

In a number of the disclosed embodiments of the method, the method may also include, prior to the transmission of each of the first IP packets over the IP switch fabric, generating, by the first LLA utilizing 1:(M−1) path protection, parity information for the first ODU cells in every M−1 IP packets of the first IP packets using exclusive or (XOR) operations that is included in a corresponding Mth IP packet of the first IP packets. The UDP source port number of the corresponding header of each of the first IP packets may further comprise a parallel path number associated with a parallel path of the M parallel paths. The method may further include, prior to the de-map of the first IP packets into the first ODU cells, determining, by the second LLA utilizing 1:(M−1) path protection, whether the M−1 IP packets of the first IP packets and the Mth IP packet of the first IP packets including the parity information for the first ODU cells have been received, and when only M−2 IP packets of the first IP packets and the Mth IP packet of the first IP packets have been received, recovering, by the second LLA, a lost IP packet of the M−1 IP packets from the M−2 IP packets and the parity information received using XOR operations.

In a number of the disclosed embodiments of the method, the method may also include performing, by the first LLA, a time of day synchronization process to synchronize a first time of day clock of the first LLA with an Internet time of day clock of the LLA network switching system. The method may further include, prior to the transmission of each of the first IP packets over the IP switch fabric, adjusting, by the first LLA, the timestamp of the corresponding header of each of the first IP packets based on the synchronized first time of day clock and performing, by the second LLA, the time of day synchronization process to synchronize a second time of day clock of the second LLA with the Internet time of day clock.

In a number of the disclosed embodiments of the method, the method may also include performing, by the first LLA, a time of day synchronization process to synchronize a first time of day clock of the first LLA with an Internet time of day clock of the LLA network switching system. The method may further include, prior to the transmission of each of the first IP packets over the IP switch fabric setting, by the first LLA, each of first path latency measurements based on the first time of day clock, transmitting, by the first LLA, each of the first path latency measurements to the second LLA via a respective one of the M parallel paths of the IP switch fabric, and receiving, by the first LLA, a round robin order of M parallel path queues of the second LLA from the second LLA, each of the M parallel path queues corresponding to the respective one of the M parallel paths. Transmitting each of the first IP packets over the IP switch fabric may be further based on the round robin order of the M parallel path queues. The method may also include performing, by the second LLA, the time of day synchronization process to synchronize a second time of day clock of the second LLA with the Internet time of day clock of the LLA network switching system, determining, by the second LLA, a low 10 time value and a high 90 time value of each respective one of the M parallel paths based on the first path latency measurements and the second time of day clock, sorting, by the second LLA, the M parallel path queues in the round robin order of the low 10 time value of each respective one of the M parallel paths with the lowest low 10 time value being the first in the round robin order, setting, by the second LLA, a watermark time value for the M parallel path queues as the highest high 90 time value of each respective one of the M parallel paths, and transmitting, by the second LLA, the round robin order of the M parallel path queues to the first LLA.

In a number of the disclosed embodiments of the method, receiving each of the first IP packets over the IP switch fabric may be further based on the round robin order of the M parallel path queues. The method may also include, prior to de-mapping the first IP packets into the first ODU cells, re-sequencing, by the second LLA, each of the first IP packets received in the round robin order into a re-sequence queue in a re-sequenced placement order based on each sequence number and timestamp of each corresponding header of each of the first IP packets. De-mapping the first IP packets may be based on the re-sequenced order.

In a number of the disclosed embodiments of the method, the watermark time value may be used to begin re-sequencing each of the first IP packets received in the round robin order into the re-sequence queue.

In a number of the disclosed embodiments of the method, the method may also include, when a confirmation that one of the M parallel paths failed is received, utilizing, by the first LLA, 1:(M−2) path protection and the M−1 working parallel paths for transmitting IP packets and receiving IP packets. The method may further include, when the confirmation that one of the M parallel paths failed may be received, utilizing, by the second LLA, 1:(M−2) path protection and the M−1 working parallel paths for IP packet transmission and IP packet reception.

In a number of the disclosed embodiments of the method, a protocol of UDP, a IP source address, a IP destination address, the UDP source port number, and the UDP destination port number of the corresponding header of each of the first IP packets may enable 5-Tuple inspection based equal cost multi-path routing over the IP switch fabric.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
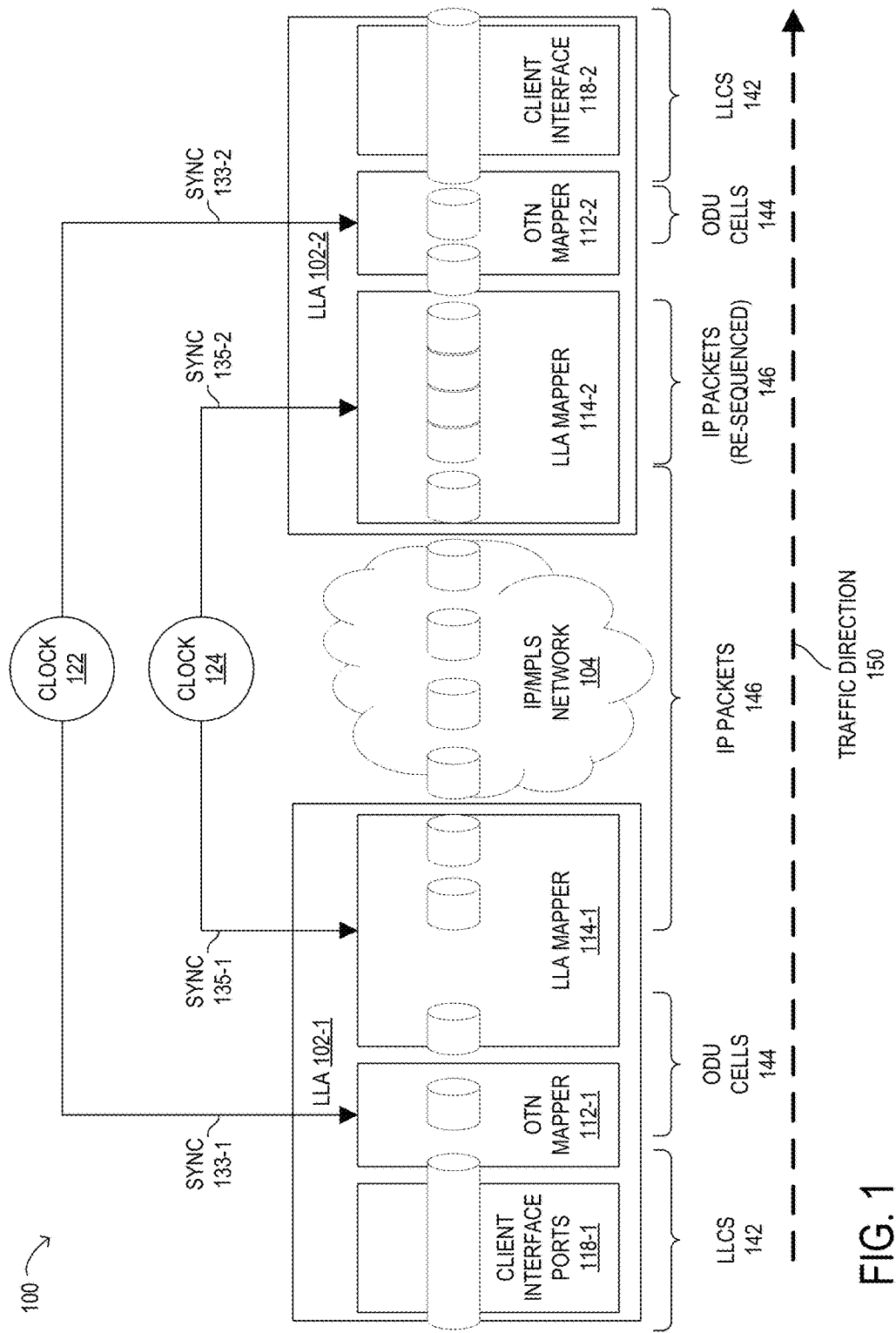
FIG. 1 is a block diagram of selected elements of an embodiment of a leased line appliance network switching system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As previously described, carriers build dedicated TDM and WDM networks, OTNs, and SONET networks for leased line services. The granularity of these leased lines has scaled up from the old digital signal 1 (DS1) and digital signal 3 (DS3) to today's 10 Gigabit Ethernet and 100 Gigabit Ethernet. However, the wide area communication and networking traffic carried over leased lines is only a small fraction of the total traffic and generic IP/MPLS networks continue to grow at faster paces than these leased lines. As described in Requirements for Edge-to-Edge Emulation of Time Division Multiplexed (TDM) Circuits over Packet Switching Networks, IETF, October 2005, Structure-Agnostic Time Division Multiplexing (TDM) over Packet (SAToP), IETF, June 2006, Synchronous Optical Network/Synchronous Digital Hierarchy (SONET/SDH) Circuit Emulation over Packet (CEP), IETF, April, 2007, and Implementation Agreement for the Emulation of PDH Circuits over Metro Ethernet Networks, Metro Ethernet Forum, October 2004, carriers have implemented circuit emulation services (CES) to carry DS1, DS3, and optical carrier 3/optical carrier 12 (OC-3/OC-12) in the fashion of single stream serialized packets carrying digital bit samples. The resulting traffic can incur significant traffic overheard ranging from approximately a 20% overhead to approximately as 50% overhead or higher if reasonable packetization delays and therefore reasonable latency of the emulated circuits are expected. Furthermore, the current schemes have an implicit assumption that the underlying packet networks have link bandwidths much larger than the bandwidth of any leased line services as CES. If the leased line traffic could be carried over these generic IP/MPLS networks, then the carriers would not need to build new TDM networks such as OTNs for leased line services, which would result in significant cost savings. However, there has been no attempt to carry high speed Ethernet leased line services over IP/MPLS networks, which is partly due to the limitations of today's CES technology. For example, if the highest speed link of a IP/MPLS network is a 100 Gigabit Ethernet, a 100 Gigabit Ethernet leased line service using current CES technology with its associated packetization overhead would result in an emulated packet stream much larger than 100 Gigabit, which would exceed the capability of the IP/MPLS network.

As will be described in further detail herein, the inventors of the present disclosure have discovered systems and methods for carrying high capacity bit transparent leased line services over IP/MPLS networks. In the present solution, leased line appliances (LLAs) are utilized to carry high capacity leased line services over a generic IP/MPLS network with capacity higher than the highest speed link of the underlying IP/MPLS network. The LLAs also ensure that the latencies of the leased line services are managed. In this solution, high capacity leased line services are carried over a set of multiple paths through an IP/MPLS network, allowing the LLA IP/MPLS network to take advantage of new generations of IP/MPLS networks, while achieving the capability to carry high capacity leased line services without having to upgrade the underlying network. The LLAs may add multi-path RAID information into normal UDP port numbers of the IP packets so that the IP/MPLS network may utilize 5-Tuple hashing to do ECMP, which automatically provides the multi-pathed circuit emulation in the network. By adding the multi-path RAID information to the IP packet headers, the LLA may be implemented as a simple IP host rather than being implemented as a sophisticated IP/MPLS service router (SR) that would be much more expensive than the simple IP host implementation. The cost of the sophisticated IP/MPLS/SR may be as much as several orders of magnitude higher than the cost of the simple IP host. The LLAs utilize RAID techniques to protect the multi-pathed circuit emulation so that any failure on one of the paths will not impact the leased line services. This solution also uses time of day (Tod) clock synchronization of each ToD clock of each LLA to an Internet ToD reference clock to provide path latency measurements so that multiple paths through an IP/MPLS network can be pre-qualified against the objective of the latency of the leased line services. These latency measurements are also used to set a watermark and choose a round robin order to drain IP packet reception queues of the destination LLA to further improve the latency of the LLC. Because of integrating the RAID channel in otherwise standard UDP port numbers to utilize an IP/MPLS networks' ECMP capability, an Emulated LLC can have bandwidth much larger than the bandwidth of the underlying network links of IP/MPLS networks.

Turning now to the drawings, FIG. 1 illustrates an example embodiment of a leased line appliance (LLA) network switching system 100. Leased line appliance network switching system 100 may include, but is not limited to, LLAs 102 including LLA 102-1 and LLA 102-2, an Internet Protocol/Multi-Protocol Label Switching (IP/MPLS) network 104, a network primary reference clock 122, and an Internet time of day (ToD) clock 124. Each LLA 102 may include an optical transport network (OTN) mapper 112, a LLA mapper 104, and client interface ports 118.

As shown in FIG. 1, LLA network switching system 100 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be used by LLA network switching system 100 to transport the ODUs. The packetized overhead may be used to monitor and control the optical signals being transported using any of a variety of different protocols. Examples of the data rates and applications of an ODUk in an LLA network switching system 100 as defined in ITU-T Recommendation G.709 are given in Table 1 below.

TABLE 1

Data rates and applications of ODUk signals.

| Signal | Data rate (Gbits/s) | Applications may include |
|---|---|---|
| ODU0 | 1.244 | Transport of a timing transparent transcoded (compressed) 1000BASE-X signal or a stream of packets (such as Ethernet, multiprotocol label switching (MPLS) or Internet Protocol (IP)) |
| ODU1 | 2.499 | Transport of two ODU0 signals or a synchronous transport signal 48 (STS-48)/synchronous transport module 16 (STM-16) signal or a stream of packets (such as Ethernet, MPLS or IP) |
| ODU2 | 10.037 | Transport of up to eight ODU0 signals or up to four ODU1 signals or a STS192/STM64 signal or a wide area network physical layer (WAN PHY) 10GBASE-W or a stream of packets (such as Ethernet, MPLS or IP) |
| ODU2e | 10.399 | Transport of a 10 Gigabit Ethernet signal or a timing transparent transcoded (compressed) Fibre Channel 10GFC signal |
| ODU3 | 40.319 | Transport of up to 32 ODU0 signals or up to 16 ODU1 signals or up to four ODU2 signals or a STS-768/STM-256 signal or a timing transparent transcoded 40 Gigabit Ethernet signal or a stream of packets (such as Ethernet, MPLS or IP) |
| ODU4 | 104.794 | Transport of up to 80 ODU0 signals or up to 40 ODU1 signals or up to ten ODU2 signals or up to two ODU3 signals or a 100 Gigabit Ethernet signal |

In particular embodiments, operation of LLA network switching system 100 are performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in LLA network switching system 100 may rely on a hierarchical implementation of time-division multiplexing (TDM) to optimize carrier wavelength efficiency.

As shown in FIG. 1, LLA 102-1 may receive leased line circuits (LLCs) 142 over a leased line from a client system (not shown in FIG. 1) at client interface ports 118-1. OTN mapper 112-1 may map LLCs 142 into optical data units (ODUs) and then assemble the ODUs into ODU cells 144. OTN mapper 112-1 may provide ODU cells 144 to LLA mapper 114-1. LLA mapper 114-1 may map ODU cells 144 into IP packets 146 using user datagram protocol (UDP), each one of the IP packets 146 having a corresponding IP header and header information including a LLA header having timing and sequence information and a UDP/IP header having source and destination ODU channel identifications (ID). In one or more embodiments, the UDP/IP header may also include an equal cost multi-channel (ECMP) path ID. LLA mapper 114-1 may transmit IP packets 146 to an ingress edge router of IP/MPLS network 104. The ingress edge router will forward IP packets 146 to LLA 102-2 using the UDP/IP header information including the destination ODU channel ID. In one or more embodiments, the ingress edge router may utilize the destination IP address and the destination ODU channel ID to perform a 5-Tuple based look up to facilitate ECMP forwarding.

When LLA 102-2 receives IP packets 146 from an egress edge router of IP/MPLS network 104, LLA mapper 114-2 may utilize the timing and sequence information of the LLA header of each received IP packet 146 to re-sequence the IP packets 146 in the original order they were transmitted by LLA 102-2. LLA mapper 114-2 may de-map the IP packets 146 into the ODU cells 144 based on each corresponding header of each IP packet 146. LLA mapper 114-2 may provide the ODU cells 144 to OTN mapper 112-2. OTN mapper 112-2 may reassemble the ODUs from the ODU cells 144. OTN mapper 112-2 may de-map the ODUs into LLCs 142. LLA 102-2 may transmit LLCs 142 over a leased line to the client system. In this manner, LLA network switching system 100 transmits LLCs 142 from the source LLA 102-1 coupled to the client system to the destination LLA 102-2 coupled to the client system in the direction indicated by traffic direction 150 while preserving PCS level transparency. In one or more embodiments, instead of using ODUs as the blocks to be transported, PCS code blocks may be used at the transport unit.

Each LLA 102 may perform a frequency synchronization process to synchronize a respective ODU clock (not shown) to network primary reference clock 122 via sync 133. This allows Each LLA 102 to be synchronized with a common reference clock such as network primary reference clock 122 and to be synchronized with each other. Each LLA 102 utilizes the respective synchronized ODU clock for ODU stream transmissions, reassembly, and de-jittering functions and allows proper recovery of client signals at the egress LLA 102-2 transmitted from the ingress LLA 102-1. Each LLA 102 may also perform a time of day synchronization process to synchronize a respective time of day (ToD) clock of LLA 102 (not shown) to Internet ToD clock 124 via sync 135, which allows each respective ToD clock of each LLA 102 to be synchronized with a common ToD clock such as Internet ToD clock 135 and be synchronized with each other.

LLA 102-1 utilizes the respective ToD clock to provide the timing information such as timestamps carried in the LLA header of each IP packet 146. It also allows LLA 102-1 to provide path latency measurements to reduce the memory requirements for reassembly and resequencing of the IP packets 146 at the destination LLA 102-2.

Figure 2:
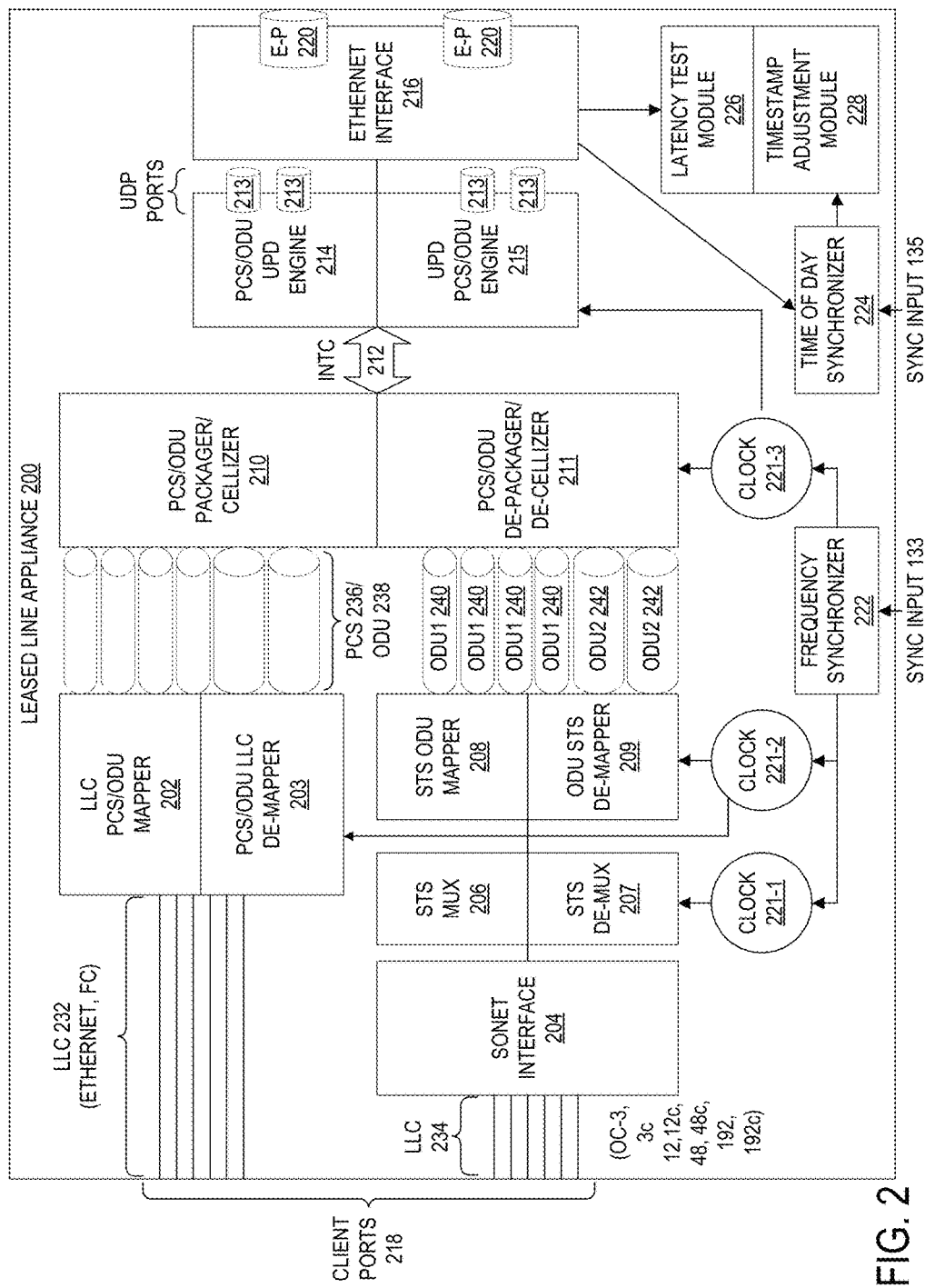
FIG. 2 is a block diagram of selected elements of an embodiment of a leased line appliance.

Referring now to FIG. 2, a block diagram of selected elements of an embodiment of a leased line appliance (LLA) 200 is illustrated. Leased line appliance 200 in FIG. 2 may be implemented for performing leased line circuits (LLCs) to Internet Protocol (IP) packet assembly procedures, performing IP packet to LLCs re-assembly procedures, and utilizing protocol fields within an IP packet header of the IP packet for IP packet transport, which may enable transport of very high speed leased line services to be carrier over an IP switch fabric in a LLA switching network. FIG. 2 is a schematic diagram for descriptive purposes and is not drawn to scale or perspective.

LLA 200 may include, but is not limited to, a LLC physical coding sublayer (PCS)/optical data unit (ODU) mapper 202, a PCS/ODU LLC de-mapper 203, a synchronous optical network (SONET) interface 204, a synchronous transport signal (STS) multiplexer (MUX) 206, a STS de-multiplexer (De-MUX) 207, a STS ODU mapper 208, a ODU STS de-mapper 209, a PCS/ODU packager/cellizer 210, a PCS/ODU de-packager/de-cellizer 211, an interconnect (INTC) 212, a PCS/ODU user datagram protocol (UDP) engine 214, a UDP PCS/ODU engine 215, an Ethernet interface 216, a set of client ports 218, Ethernet ports (E-P) 220, clocks 221 including clocks 221-1, 221-2, and 221-3, a frequency synchronizer 222, a time of day synchronizer 224, a latency test module 226, and a timestamp adjustment module 228. A first subset of the set of client ports 218 may be coupled to LLC PCS/ODU mapper 202 and PCS/ODU LLC de-mapper 203. A second subset of the set of client ports 218 may be coupled to SONET interface 204. PCS/ODU packager/cellizer 210 may be coupled to PCS/ODU UDP engine 214 by interconnect 212. PCS/ODU de-packager/de-cellizer 211 may be coupled to UDP PCS/ODU engine 215 by interconnect 212. Clock 221-1 may be coupled to STS MUX 206 and STS De-MUX 207. Clock 221-2 may be coupled to STS ODU mapper 208, STS ODU de-mapper 209, LLC PCS/ODU mapper 202, and PCS/ODU LLC de-mapper 203. Clock 221-3 may be coupled to PCS/ODU UDP engine 214, UDP PCS/ODU engine 215, clock 221-1, and clock 221-2. Clocks 221-1, 221-2, and 221-3 may be synchronized with each other, and may each comprise a frequency clock. Clocks 221-1, 221-2, and 221-3 may be utilized by LLA 200 to ensure that STS MUX 206, STS De-MUX 207, STS ODU mapper 208, STS ODU de-mapper 209, LLC PCS/ODU mapper 202, PCS/ODU LLC de-mapper 203, PCS/ODU UDP engine 214, and UDP PCS/ODU engine 215 are all synchronized with each other. INTC 212 may comprise an Interlaken interconnect protocol.

SONET is a set of transport containers that allow for delivery of a variety of protocols, including traditional telephony, asynchronous transfer mode (ATM), Ethernet, and Transmission Control Protocol/Internet Protocol (TCP/IP) traffic. The SONET communications protocol is a multiplexed structure, with a header interleaved between data. This permits the encapsulated data to have its own frame rate and be able to "float around" relative to a SONET frame structure and rate. This interleaving permits a very low latency for the encapsulated data. The basic unit of transmission in SONET is a synchronous transport signal 1 (STS-1) carried within an optical carrier signal, operating at an OC transmission rate. OC transmission rates are a standardized set of specifications of transmission bandwidth for digital signals that can be carried on SONET fiber optic networks. Transmission rates are defined by rate of the bit stream of the digital signal and are designated by hyphenation of the acronym OC and an integer value of the multiple of the basic unit of rate, e.g., OC-48. The base unit is 51.84 Mbit/s. Thus, the speed of optical-carrier-classified lines labeled as OCn is n×51.84 Mbit/s. As shown in FIG. 2, one or more client ports 218 may receive LLCs 234 over OC-3, OC-3c, OC-12, OC-12c, OC-48, OC-48c, OC-192, and OC-192c optical-carrier-classified lines. LLCs 234 may comprise STS-3 carried within an OC-3 signal over an OC-3 optical-carrier-classified line, STS-3c carried within an OC-3c signal over an OC-3c optical-carrier-classified line, STS-12 carried within an OC-12 signal over an OC-12 optical-carrier-classified line, STS-12c carried within an OC-12c signal over an OC-12c optical-carrier-classified line, STS-48 carried within an OC-48 signal over an OC-48 optical-carrier-classified line, STS-48c carried within an OC-48c signal over an OC-48 optical-carrier-classified line, STS-192 carried within an OC-192 signal over an OC-192 optical-carrier-classified line, or STS-192c carried within an OC-192c signal over an OC-192c optical-carrier-classified line. As shown in FIG. 2, one or more client ports 218 of LLA 200 may be coupled to an optical transport network, one or more client optical transport leased lines, and/or one or more other types of client leased lines.

During operation, a source LLA 200 may receive first LLCs 232 over first leased lines at a first subset of the set of client ports 218. The first LLCs 232 may comprise Fibre Channel (FC) signals, Ethernet signals (1G and up), a stream of Ethernet packets, other types of optical signals, or streams of other types of packets. LLC PCS/ODU mapper 202 may map the received first LLCs 232 into first PCS code blocks 236. LLC PCS/ODU mapper 202 may provide the first PCS code blocks 236 to PCS/ODU packager/cellizer 210. PCS/ODU packager/cellizer 210 may assemble the first PCS code blocks 236 into a first PCS code block package. PCS/ODU packager/cellizer 210 may provide the first PCS code block package to PCS/ODU UDP engine 214 via interconnect (INTC) 212. PCS/ODU UDP engine 214 may map the first PCS code block package into first Internet Protocol (IP) packets using user datagram protocol (UDP), each of the first IP packets having corresponding header information and data described in further detail with reference to FIG. 3.

Figure 3:
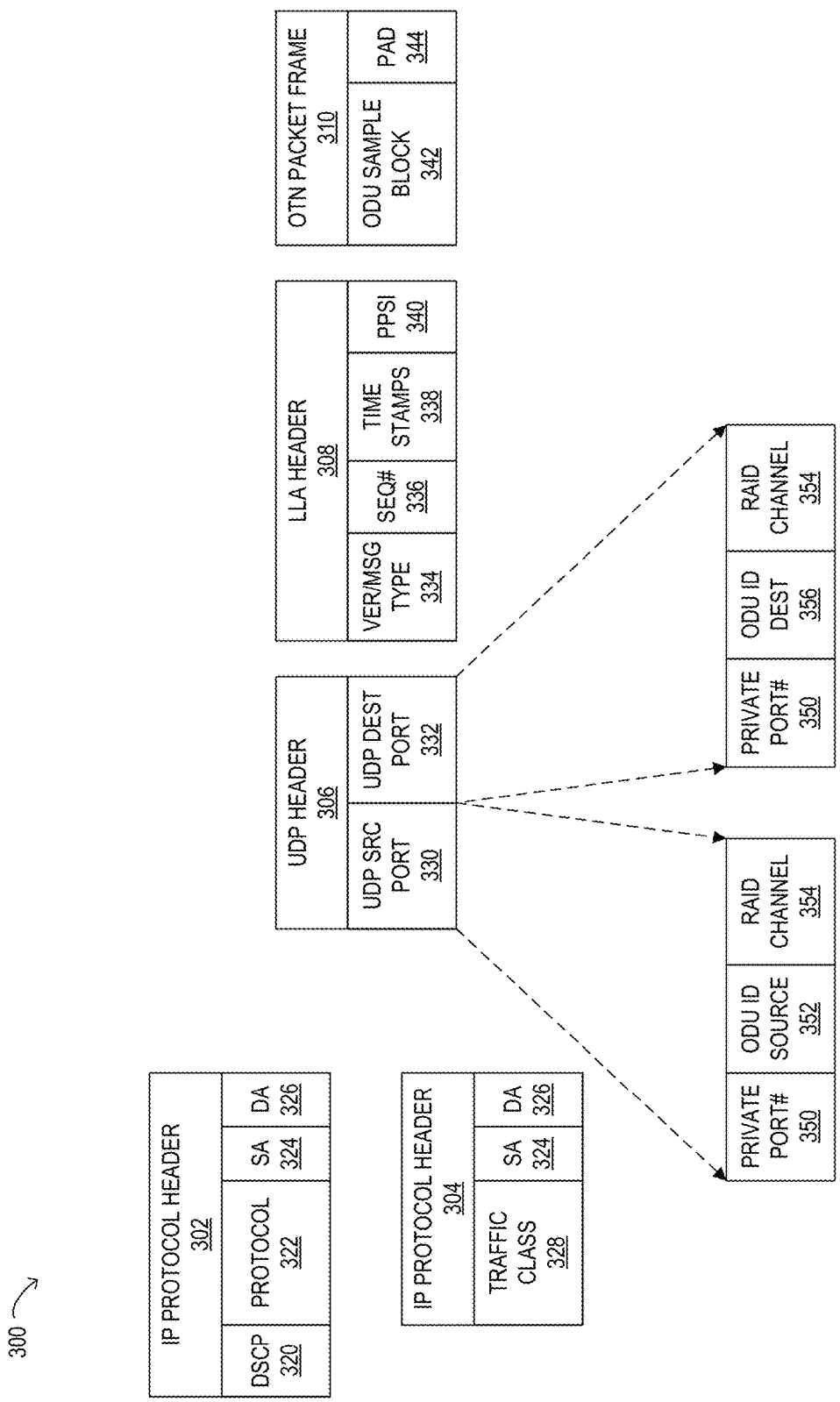
FIG. 3 is a block diagram of selected elements of embodiments of various protocol headers and frames.

In FIG. 3, each of the first IP packets may comprise an IP protocol header, a UDP header 306, a LLA header 308, and an OTN packet frame 310. The IP protocol header may comprise an IP protocol header 302 or an IP protocol header 306. IP protocol header 302 may comprise a standard IP version 4 (IPv4) header including a differentiated services code point (DSCP) 320 field, a protocol 322 field, a source address (SA) 324, and a destination address (DA) 326. IP protocol header 304 may comprise a standard IP version 6 (IPv6) header including a traffic class 328 field, SA 324, and DA 326. PCS/ODU UDP engine 214 may set protocol 332 to the UDP protocol. PCS/ODU UDP engine 214 may set SA 324 and DA 326 based on the source and destination addresses of LLCs 232.

UDP header 306 may comprise a UDP source port 330 field and a UDP destination port 332 field. UDP source port 330 may comprise a private port number 350 field, an ODU identification (ID) source 352 field, and a redundant array of inexpensive disks (RAID) channel 354 field. UDP destination port 332 may comprise private port number 350 field, an ODU ID destination 356 field, and RAID channel 354 field. Private port number 350 may comprise the first set of bits of both UDP source port 330 and UDP destination port 332 and is set to a fixed value defined by the Internet Engineering Task Force (IETF) standards, which may ensure that any UDP ports utilized by LLA 200 are private ports and avoid conflicting with well-known and established port numbers for various IP protocols. RAID channel 354 may comprise the last set of bits of both UDP source port 330 and UDP destination port 332 and may be utilized to identify the equal cost multi-channel (ECMP)/RAID channel such that UDP source port 330 and UDP destination port 332 have the same ECMP/RAID channel. Using the last set of bits of both UDP source port 330 and UDP destination port 332 as RAID channel 352 to identify potential ECMP/RAID channels of the IP switch fabric enables ingress routers/switches of the IP switch fabric to exploit the parallelism of the IP switch channel. The ECMP/RAID channel of RAID channel 354 may also be set to a value that may indicate that an IP switch fabric does not support ECMP/RAID or may indicate that the ECMP/RAID channel is a forbidden value.

In one or more embodiments, UDP source port 330 and UDP destination port 332 may comprise 16 bits, private port number 350 may comprise the first 3 bits of both UDP source port 330 and UDP destination port 332 and may be set to the value 110 to avoid any conflicts with well-known port number. RAID channel 354 may comprise the last 4 bits of both UDP source port 330 and UDP destination port 332. A RAID channel ID of 1111 may indicate that ECMP/RAID is not supported by the IP switch fabric and a RAID channel ID of 1110 may indicate that the RAID channel ID is forbidden, leaving 14 possible RAID channel ID values. In other words, in these embodiments, there will be a maximum number of 14 parallel paths supported by LLA 200. ODU ID source 352 may comprise the remaining 9 bits of UDP source port 330 and ODU ID destination 356 may comprise the remaining 9 bits of UDP destination port 332. SA 324, ODU ID source 352, DA 326, and ODU ID destination 356 may be concatenated together to form a unique leased line circuit ID. OTN packet frame 310 may comprise ODU sample block 342 and pad bits 344. ODU sample block 342 may contain an ODU sample.

For an IP switch fabric of an LLA network switching system that provides M parallel paths between a source LLA 200 and a destination LLA 200 of the LLA switching system, 1:(M−1) RAID level 5 (RAIDS) may be utilized to distribute an ODU stream and its parity into the M parallel paths. RAIDS is a technology commonly used with disk arrays such that for a system including M disks, if any one of the M disks fail, all data can still be recovered through XOR of the remaining M−1 disks. Similarly, when RAIDS is used on an ECMP IP switch fabric, if any one of the M parallel paths has a persistent failure, the destination LLA 200 can still recover the full parallel path from the remaining M−1 paths. This may reduce or eliminate the needs for classical FRR (fast re-route) and may provide valuable time needed by the routing network of the IP switch fabric and/or a software defined networking (SDN) controller to recalculate an alternative parallel path to the failed parallel path, if needed. In one or more embodiments, when the source LLA 200 and the LLA destination 200 receive confirmation that one of the M parallel paths has failed, the source LLA 200 and the destination LLA 200 may agree, via a light weight signaling protocol between them, to utilize 1:(M−2) RAIDS so that the new M−1 RAID channels can match the M−1 parallel paths in the IP switch fabric. By utilizing RAIDS, persistent failures are handled as described above in addition packet losses due to either bit-errors or IP switch fabric traffic congestion. In an LLA network switch system utilizing RAIDS, only 1/M of the traffic capacity of the IP switch fabric is used for carrying redundancy information while (M−1)/M of the traffic capacity is used to carry client data, which makes the efficiency of fault tolerance with RAIDS very efficient for an ECMP LLA network switching system environment.

In an exemplary embodiment, LLA header 308 may comprise a version/message type 334 field, a sequence number 336 field, a timestamp 338 field, and a Precision time protocol (PTP) Ported to Silicon (PPSI) 340 field. LLA 200 may utilize sequence number 336 to indicate the original sequence order of each ODU sample of each IP packet of the first IP packets transmitted from an ingress LLA 200 over parallel paths of the IP switch fabric to an egress LLA 200. The egress LLA 200 may then utilize the sequence number 336 of each ODU sample received to re-sequence each ODU sample back into the original sequence order. PCS/ODU UDP engine 214 may set timestamp 338 based on time of day synchronizer 224 of LLA 200.

Protocol 322, SA 324, DA 326, UDP source port 330, and UDP destination port 332 of each of the first IP packets may be utilized by generic service router (SR) routers and EMCP capable IP switches of the IP switch fabric to identify microflows to fill the M parallel paths of equal cost, which takes advantage of the parallel resources of the IP switch fabric and also provides fault tolerance. These are commonly called 5-tuple look up and may enable 5-Tuple inspection based equal cost multi-path routing over the IP switch fabric.

Referring back to FIG. 2, PCS/ODU UPD engine 214 may provide the first IP packets to Ethernet interface 216. In one or more embodiments, PCS/ODU UPD engine 214 may comprise M UDP ports 213 that PCS/ODU UPD engine 214 may utilize to provide the first IP packets to Ethernet interface 216. The number M of the M UDP ports 213 may equal the number M of the M parallel paths in the IP switch fabric. PCS/ODU UPD engine 214 may utilize 1:(M−1) RAIDS across all M UDP ports and across all M parallel paths.

Ethernet interface 216 may receive the first IP packets from PCS/ODU UPD engine 214. Ethernet interface 216 may utilize timestamp adjustment module 228 to adjust the timestamps 338 within each LLA header 308 of the first IP packets based on path latency measurements of the M parallel paths of the IP switch fabric measured by latency test module 226 and time of day synchronization results of time of day synchronizer 224, described in further detail below. Next, Ethernet interface 216 may transmit the first IP packets to an ingress IP router of the IP switch fabric via an Ethernet port 220 of a set of N Ethernet ports 220 of Ethernet interface 216 with the respective parallel path of the M parallel paths corresponding to each RAID channel 354 of the first IP packets. In one or more embodiments, when PCS/ODU UPD engine 214 comprises M UDP ports 213, the number N of the N Ethernet ports 220 may be less than or equal to the number M of the M UDP ports 213. There is no need to have M physical Ethernet ports to couple the source LLA 200 to the ingress router of the IP switch fabric. The N Ethernet ports are sufficient where N may be less than or equal to M, for example, N may be equal to 1.

Ethernet interface 216 of the destination LLA 200 may receive the first IP packets from an egress IP router of the IP switch fabric via an Ethernet port 220 of a set of N Ethernet ports 220 of Ethernet interface 216. Ethernet interface 216 of the destination LLA 200 may utilize each sequence number 336 and each timestamp 338 of LLA header 308 of each of the first IP packets to re-sequence the first IP packets in the original order they were transmitted. Ethernet interface 216 of the destination LLA 200 may provide the first IP packets to UDP PCS/ODU UPD engine 215 of the destination LLA 200. In one or more embodiments, Ethernet interface 216 of the destination LLA 200 may provide the first IP packets to UDP PCS/ODU UPD engine 215 of the destination LLA 200 over M UDP ports 213. UDP PCS/ODU engine 215 of the destination LLA 200 may de-map the first IP packets into the first PCS code block package based on each corresponding header of each of the first IP packets. UDP PCS/ODU engine 215 of the destination LLA 200 may provide the first PCS code block package to PCS/ODU de-packager 211 via INTC 212. PCS/ODU de-packager 211 of the destination LLA 200 may extract PCS code blocks 236 from the first PCS package block based on each ODU ID source 352 of UDP source port 330 of UDP header 306 and each ODU ID destination 356 of UDP destination port 332 of UDP header 306 of each of PCS code blocks 236 of the first PCS package block. PCS/ODU de-packager 211 of the destination LLA 200 may provide PCS code blocks 236 to PCS/ODU LLC de-mapper 203 of the destination LLA 200. PCS/ODU LLC de-mapper 203 of the destination LLA 200 may de-map PCS code blocks 236 into the first LLCs. The destination LLA 200 may transmit the first LLCs over an egress leased line of egress leased lines at a first subset of the set of client ports 218 of the destination LLA 200.

In one or more embodiments, source and destination LLAs 200 may utilize ODU streams and ODU cells instead of PCS code blocks 236 and PCS code block packages for LLC circuits to/from IP packets conversion and transmission in a similar manner as described above. During operation, a source LLA 200 may receive first LLCs 232 over an ingress leased line of ingress leased lines at a first subset of the set of client ports 218. LLC PCS/ODU mapper 202 of source LLA 200 may map the received first LLCs 232 into first ODUs 238. LLC PCS/ODU mapper 202 of source LLA 200 may provide the first ODUs 238 to PCS/ODU packager/cellizer 210 of source LLA 200. PCS/ODU packager/cellizer 210 of source LLA 200 may assemble ODUs 238 into first ODU cells. PCS/ODU packager/cellizer 210 of source LLA 200 may provide the first ODU cells to PCS/ODU UDP engine 214 of source LLA 200 via interconnect (INTC) 212. PCS/ODU UDP engine 214 of source LLA 200 may map the first ODU cells into first Internet Protocol (IP) packets using User Datagram Protocol (UDP), each of the first IP packets having corresponding header information and data as previously described. PCS/ODU UPD engine 214 of source LLA 200 may provide the first IP packets to Ethernet interface 216 of source LLA 200. Ethernet interface 216 of source LLA 200 may receive the first IP packets from PCS/ODU UPD engine 214 of source LLA 200. Ethernet interface 216 of source LLA 200 may transmit the first IP packets to an ingress IP router of the IP switch fabric via an Ethernet port 220 of a set of N Ethernet ports 220 of Ethernet interface 216 of source LLA 200 with the respective parallel path of the M parallel paths corresponding to each RAID channel 354 of the first IP packets.

Ethernet interface 216 of the destination LLA 200 may receive the first IP packets from an egress IP router of the IP switch fabric via an Ethernet port 220 of a set of N Ethernet ports 220 of Ethernet interface 216 of the destination LLA 200. Ethernet interface 216 of the destination LLA 200 may utilize each sequence number 336 and each timestamp 338 of LLA header 308 of each of the first IP packets to re-sequence the first IP packets in the original order they were transmitted. Ethernet interface 216 of the destination LLA 200 may provide the first IP packets to UDP PCS/ODU UPD engine 215 of the destination LLA 200. UDP PCS/ODU engine 215 of the destination LLA 200 may de-map the first IP packets into the first ODU cells based on each corresponding header of each of the first IP packets. UDP PCS/ODU engine 215 of the destination LLA 200 may provide the first ODU cells to PCS/ODU de-cellizer 211 via INTC 212. PCS/ODU de-cellizer 211 of the destination LLA 200 may re-assemble ODUs 238 from the first ODU cells based on each ODU ID source 352 of UDP source port 330 of UDP header 306 and each ODU ID destination 356 of UDP destination port 332 of UDP header 306 of each of ODUs 238 of the first PCS package block. PCS/ODU de-packager 211 of the destination LLA 200 may provide PCS code blocks 236 to PCS/ODU LLC de-mapper 203 of the destination LLA 200. PCS/ODU LLC de-mapper 203 of the destination LLA 200 may de-map ODUs 238 into the first LLCs. The destination LLA 200 may transmit the first LLCs over an egress leased line of egress leased lines at a first subset of the set of client ports 218 of the destination LLA 200.

SONET interface 204 of source LLA 200 may receive LLCs 234 over a second ingress leased line of ingress leased lines at a second subset of the set of client ports 218. SONET interface 204 of source LLA 200 may provide LLCs 234 to STS MUX 206. STS MUX 206 may multiplex LLCs 234 into first STS circuits. STS MUX 206 may provide the first STS circuits to STS ODU mapper 208. STS ODU mapper 208 may map the first STS circuits into first ODU streams. When the first STS circuits comprise one or more of STS-1, STS-3, STS-3c, STS 12, STS 12c, STS-48, and STS 48c, STS ODU mapper 208 may map the first STS circuits into ODU1 streams 240. When the first STS circuits comprise one or more of STS 192 and STS 192c, STS ODU mapper 208 may map the first STS circuits into ODU2 streams 242. STS ODU mapper 208 may provide the first ODU streams to PCS/ODU packager/cellizer 210 of source LLA 200. PCS/ODU packager/cellizer 210 of source LLA 200 may assemble the first ODU streams into first ODU cells. PCS/ODU packager/cellizer 210 of source LLA 200 may provide the first ODU cells to PCS/ODU UDP engine 214 of source LLA 200 via interconnect (INTC) 212. PCS/ODU UDP engine 214 of source LLA 200 may map the first ODU cells into first Internet Protocol (IP) packets using user datagram protocol (UDP), each of the first IP packets having corresponding header information and data as previously described. PCS/ODU UPD engine 214 of source LLA 200 may provide the first IP packets to Ethernet interface 216 of source LLA 200. Ethernet interface 216 of source LLA 200 may receive the first IP packets from PCS/ODU UPD engine 214 of source LLA 200. Ethernet interface 216 of source LLA 200 may transmit the first IP packets to the ingress IP router of the IP switch fabric via an Ethernet port 220 of Ethernet interface 216 of source LLA 200 with the respective parallel path of the M parallel paths corresponding to each RAID channel 354 of the first IP packets.

Ethernet interface 216 of the destination LLA 200 may receive the first IP packets from an egress IP router of the IP switch fabric via an Ethernet port 220 of Ethernet interface 216 of the destination LLA 200. Ethernet interface 216 of the destination LLA 200 may utilize each sequence number 336 and each timestamp 338 of LLA header 308 of each of the first IP packets to re-sequence the first IP packets in the original order they were transmitted. Ethernet interface 216 of the destination LLA 200 may provide the first IP packets to UDP PCS/ODU UPD engine 215 of the destination LLA 200. UDP PCS/ODU engine 215 of the destination LLA 200 may de-map the first IP packets into the first ODU cells based on each corresponding header of each of the first IP packets. UDP PCS/ODU engine 215 of the destination LLA 200 may provide the first ODU cells to ODU de-cellizer 211 of the destination LLA 200 via INTC 212. ODU de-cellizer 211 of the destination LLA 200 may re-assemble the first ODU cells into the first ODU streams based on the version and message type 334 of LLA header 308 of the first ODU cells. When the version and message type 334 indicates that the first ODU cells are ODU1 type cells, ODU de-cellizer 211 of the destination LLA 200 may re-assemble the first ODU cells into ODU1 type ODU streams 240. Otherwise, ODU de-cellizer 211 of the destination LLA 200 may re-assemble the first ODU cells into ODU2 type ODU streams 242. ODU de-cellizer 211 of the destination LLA 200 may provide the first ODU streams to ODU STS de-mapper 209 of the destination LLA 200. ODU STS de-mapper 209 of the destination LLA 200 may de-map the first ODU streams into the first STS circuits. ODU STS de-mapper 209 of the destination LLA 200 may provide the first STS circuits to STS De-MUX 207 of the destination LLA 200. STS De-MUX 207 of the destination LLA 200 may de-multiplex the first STS circuits into LLCs 234. STS De-MUX 207 of the destination LLA 200 may provide LLCs 234 to SONET interface 204 of the destination LLA 200. SONET interface 204 of the destination LLA 200 may transmit LLCs 234 over an egress leased line of egress leased lines at a first subset of the set of client ports 218 of the destination LLA 200.

In one or more embodiments, a source LLA 200 may, prior to the transmission of each of the first IP packets over the IP switch fabric, generate parity information for the first ODU cells in every M−1 IP packets of the first IP packets using exclusive or (XOR) operations that is included in a corresponding Mth IP packet of the first IP packets to utilize 1:(M−1) path protection. A destination LLA 200 may, prior to the de-map of the first IP packets into the first ODU cells, determine whether the M−1 IP packets of the first IP packets and the Mth IP packet of the first IP packets including the parity information for the first ODU cells have been received and when only M−2 IP packets of the first IP packets and the Mth IP packet of the first IP packets have been received, recover a lost IP packet of the M−1 IP packets from the M−2 IP packets and the parity information received using XOR operations.

Figure 4:
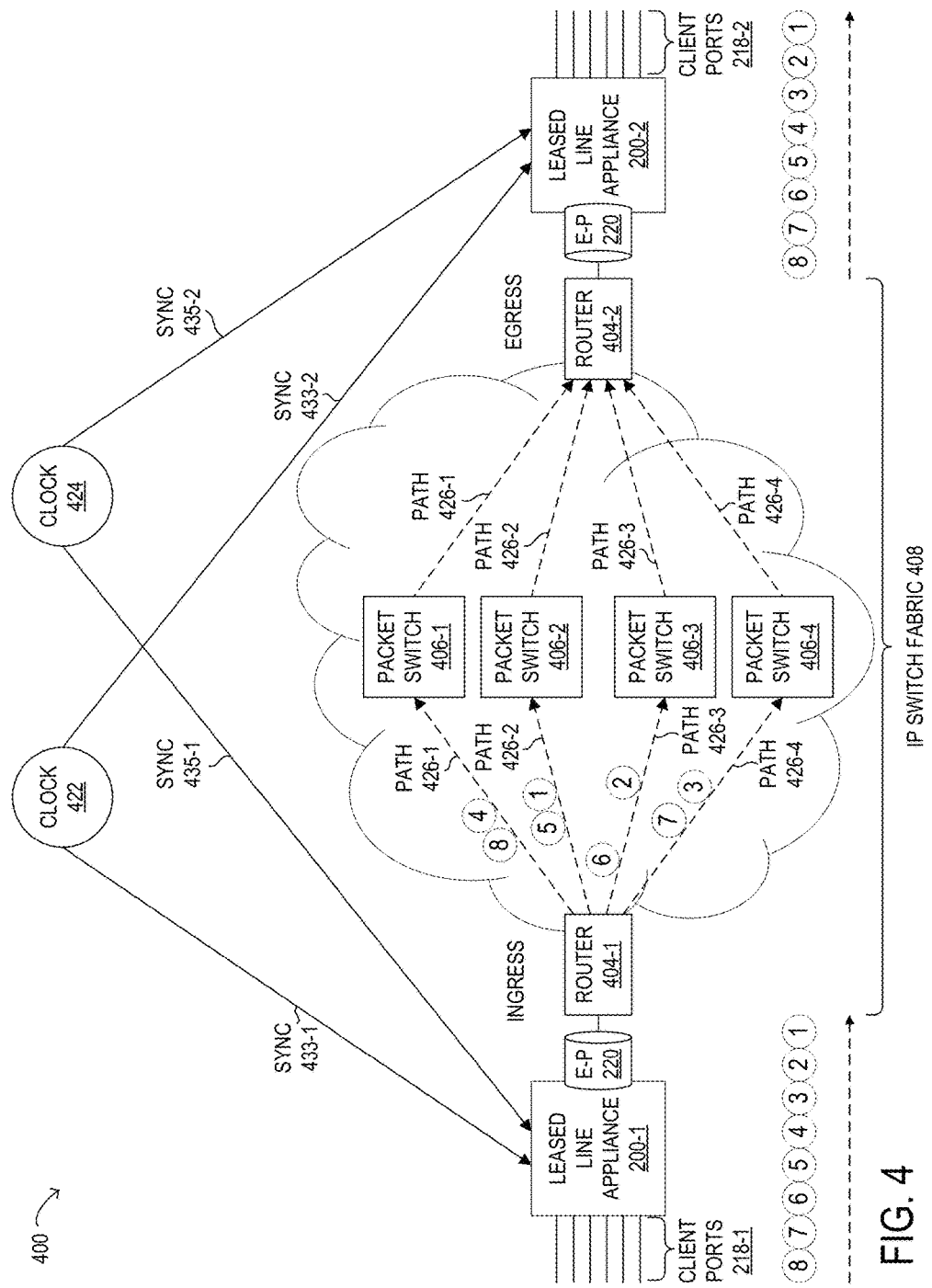
FIG. 4 is a block diagram of selected elements of an embodiment of a leased line appliance network switching system using switching fabrics and clock synchronization.

Referring now to FIG. 4, a block diagram of selected elements of an embodiment of a leased line appliance network switching system 400 using an IP switch fabric and clock synchronization is illustrated. FIG. 4 is a schematic diagram for descriptive purposes and is not drawn to scale or perspective.

LLA network switching system 400 may include, but is not limited to, a source LLA 200-1, an IP switch fabric 408, a network primary reference clock 422, an Internet ToD clock 424, and a destination LLA 200-2. IP switch fabric 408 may include an ingress router 404-1, packet switches 406 including 406-1, 406-2, 406-3, and 406-4, and an egress router 404-2.

Frequency synchronizer 222 of source LLA 200-1 may perform a frequency synchronization process to synchronize clocks 221-1, 221-2, and 221-3 to network primary reference clock 422 via sync 433-1. LLA 200 utilizes the synchronized frequency clock for ODU stream transmissions, reassembly, and de-jittering functions, and allows proper recovery of client signals at the egress LLA 200-2 transmitted from the ingress LLA 200-1. The synchronized frequency clocks 221 synchronize the frequency between a source of ingress LLCs 232 or ingress LLCs 234 and a destination of egress LLCs 232 or egress LLCs 234 such as between source LLA 200-1 and destination LLA 200-2. Clocks 221 are generally synchronized to network primary reference clock 422 due to Bit-synchronous (BMP) mapping procedures. Network primary reference clock 422 may comprise a primary reference source (PRS) telecom clock for frequency synchronization for Tx/Rx, e.g. bit synchronization (BITS) or Stratum 3e holdover. Frequency clock synchronization between LLA 200-1 and LLA 200-2 may be accomplished via traditional frequency clock distributions, which may comprise SONET, Synchronous Ethernet (SyncE), or a Precision Time Protocol (PTP). PTP may comprise IEEE 1588 version 2 PTP.

Time of day synchronizer 224 of source LLA 200-1 may perform a time of day synchronization process to synchronize with Internet ToD clock 424 via 435-1, which allows time of day synchronizer 224 of each LLA 200 to be synchronized with a common ToD clock such as Internet ToD clock 424. LLA 200-1 utilizes time of day synchronizer 224 to provide the timing information such as timestamps carried in an LLA header of each IP packet 146. It also allows LLA 200-1 to provide path latency measurements to reduce the memory requirements for reassembly and resequencing of the IP packets 146 at the destination LLA 200-2 and synchronize the time of day between source LLA 200-1 and destination LLA 200-2. Time of day synchronizer 224 is generally synchronized to Internet ToD clock 424 due to Bit-synchronous (BMP) mapping procedures. ToD clock synchronization between LLA 200-1 and LLA 200-2 may comprise a network time protocol (NTP) such as NTP version 4 (NTP4) or PTP.

Prior to the transmission of IP packets over IP switch fabric 408, latency test module 226 of LLA 200-1 may measure each of the M parallel paths 426 including parallel paths 426-1, 426-2, 426-3, and 426-4 between LLA 200-1 and LLA 200-2 through IP switch fabric 408. LLA 200-1 may set each path latency measurement of each of M parallel paths 426 based on time of day synchronizer 224 of LLA 200-1. LLA 200-1 may transmit each path latency measurement of each of M parallel paths 426 to LLA 200-2 via a respective one of the M parallel paths 426 of IP switch fabric 408. For example, LLA 200-1 may transmit path latency measurement of parallel path 426-1 to LLA 200-2 via parallel path 426-1, path latency measurement of parallel path 426-2 via parallel path 426-2, path latency measurement of parallel path 426-3 via parallel path 426-3, and path latency measurement of parallel path 426-4 via parallel path 426-4.

Frequency synchronizer 222 of LLA 200-2 may perform the frequency synchronization process to synchronize clocks 221-1, 221-2, and 221-3 of LLA 200-2 to network primary reference clock 422 via sync 433-2 and synchronize the frequency between a destination of egress LLCs 232 or egress LLCs 234 and a source of egress LLCs 232 or egress LLCs 234. Frequency synchronizer 222 of LLA 200-1 and frequency synchronizer 222 of LLA 200-2 are not trying to synchronize with each other. Rather, they are both synchronizing with a common reference clock, network primary reference clock 422. ODU stream transmissions, re-assembly, and de-jittering of LLA 200-1 and of LLA 200-2 utilize the common reference clock, network primary reference clock 422.

Time of day synchronizer 224 of LLA 200-2 may perform a time of day synchronization process to synchronize with Internet ToD clock 424 via 435-2, which allows time of day synchronizer 224 of LLA 200-2 to be synchronized with a common ToD clock such as Internet ToD clock 424. LLA 200-2 may receive each path latency measurement of M parallel paths 426-1, 426-2, 426-3, and 426-4 from LLA 200-1 over IP switch fabric 408. LLA 200-2 may determine a low 10 time value and a high 90 time value of each respective one of M parallel paths 426-1, 426-2, 426-3, and 426-4 based on each path latency measurement of M parallel paths 426-1, 426-2, 426-3, and 426-4 and time of day synchronizer 224 of LLA 200-2. LLA 200-2 may sort M parallel path queues of LLA 200-2 in round robin order of the low 10 time value of each respective one of M parallel paths 426-1, 426-2, 426-3, and 426-4 with the lowest low 10 time value being the first in the round robin order. LLA 200-2 may set a watermark time value for the M parallel path queues of LLA 200-2 as the highest high 90 time value of each respective one of M parallel paths 426-1, 426-2, 426-3, and 426-4. LLA 200-2 may transmit this round robin order of the M parallel path queues to LLA 200-1. LLA 200-1 may receive the round robin order of the M parallel path queues from LLA 200-2, each of the M parallel path queues corresponding to the respective one of the M parallel paths 426-1, 426-2, 426-3, and 426-4. The transmission of IP packets over IP switch fabric 408 may further be based on the round robin order of the M parallel path queues. Time of day synchronizer 224 of LLA 200-1 and time of day synchronizer 224 of LLA 200-2 are not trying to synchronize with each other. Rather, they are both synchronizing with a common reference clock, Internet ToD clock 424. Timestamp processing and path latency measurement utilize the common reference clock, Internet ToD clock 424.

Prior to the transmission of IP packets over IP switch fabric 408, LLA 200-1 may utilize timestamp adjustment module 228 to adjust the timestamps 338 within each LLA header 308 of the IP packets based on the path latency measurements of the M parallel paths 426-1, 426-2, 426-3, and 426-4 through IP switch fabric 408 as measured by latency test module 226 and the results of time of day synchronization by time of day synchronizer 224. In one or more embodiments, latency test module 226 LLA 200-1 may periodically measure each of the M parallel paths 426-1, 426-2, 426-3, and 426-4 to allow for continuous adjustments of the latency measurements of parallel paths 426-1, 426-2, 426-3, and 426-4, which may also result in the discovery of anomalies of transmission of IP packets over IP switch fabric 408.

As shown in FIG. 4, LLA 200-1 transmits ODUs 1, 2, 3, 4, 5, 6, 7, and 8 of each respective IP packet in sequence to ingress router 404-1 of IP switch fabric 408. Ingress router 404-1 subsequently transmits ODU 4 and ODU 8 to LLA 200-2 over parallel path 426-1. LLA 200-1 also transmits ODU 1 and ODU 5 to LLA 200-2 over parallel path 426-2. LLA 200-1 further transmits ODU 2 and ODU 6 to LLA 200-2 over parallel path 426-3. LLA 200-1 also transmits ODU 3 and ODU 7 to LLA 200-2 over parallel path 426-4. LLA 200-2 may receive ODUs 1, 2, 3, 4, 5, 6, 7, and 8 of each respective IP packet out of sequence and at different times relative to each other based on the latencies of each parallel path 426-1, 426-2, 426-3, and 426-4, as shown in FIG. 5.

Figure 5:
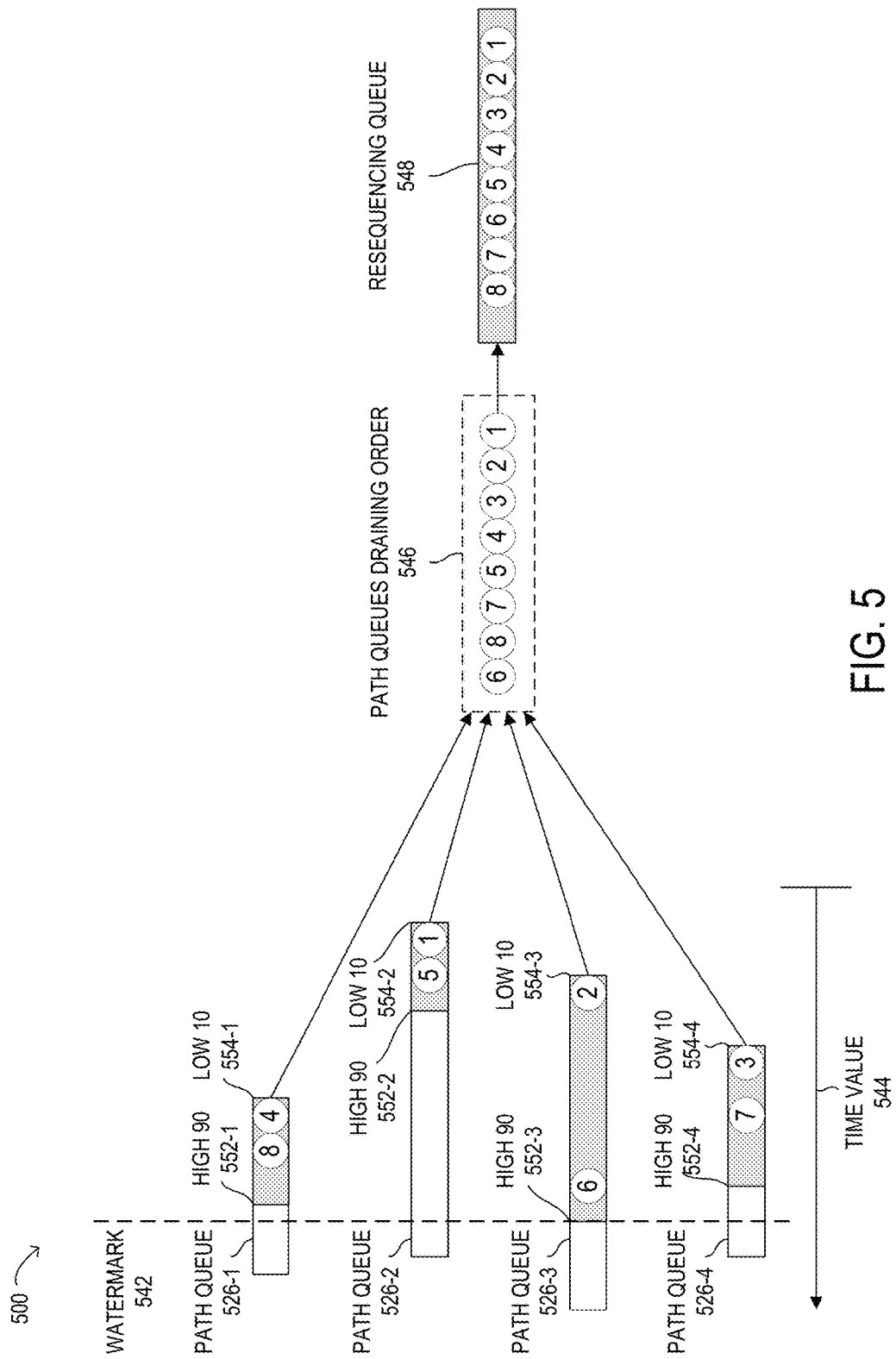
FIG. 5 is a block diagram of selected elements of an embodiment of Internet Protocol packet flow in a leased line appliance network switching system.

In FIG. 5, each parallel path 426 of parallel paths 426-1, 426-2, 426-3, and 426-4 of LLA 200-2 has its own respective path queues 526 including path queue 526-1, 526-2, 526-3, and 526-4, respectively, for LLA IP packet descriptors. Each path queue 526 includes its respective low 10 value 554 and high 90 time value 552 based on the parallel path latency measurements of each one of parallel paths 426-1, 426-2, 426-3, and 426-4, as described above. Path queues 526-1, 526-2, 526-3, and 526-4 have a low 10 time value 554-1 and a high 90 time value 552-1, a low 10 time value 554-2 and a high 90 time value 552-2, a low 10 time value 554-3 and a high 90 time value 552-3, and a low 10 time value 554-4 and a high 90 time value 552-4, respectively. The round robin order for draining path queues 526 may start with the path queue 526 with the lowest low 10 time value 554. In FIG. 5, path queue 526-2 has the lowest low 10 time value 554-2. As such, LLA 200-1 will start the round robin sequence with path queue 526-2 for draining path queues 526, followed by path queue 526-3, path queue 526-4, and path queue 526-1. Watermark time value 542 may be set by LLA 200-2 to the highest high 90 time value 552 of path queues 526. In FIG. 5, watermark time value 542 may be set to high 90 time value 552-3 of path queue 526-3 since it is the highest high 90 time value 552. Watermark time value 542 is used to start draining the ODUs of each respective IP packet from the path queues 526. LLA 200-2 drains ODU 1 from path queue 526-2, ODU 2 from path queue 562-3, ODU 3 from path queue 526-4, ODU 4 from path queue 526-1, ODU 5 from path queue 562-2, and ODU 7 from path queue 526-4. ODU 6 has not yet arrived by the time ODU 7 has arrived, so LLA 200-2 skips path queue 526-3 in the round robin order and drains ODU 7 from path queue 526-4, ODU 8 from path queue 526-1, and then ODU 6 from path queue 562-3, as LLA 200-2 skips path queue 526-2 because it is now empty. The resulting path queues draining order 546 is ODU 1, ODU 2, ODU 3, ODU 5, ODU 7, ODU 8, and ODU 6. While each timestamp 338 associated with each ODU of each respective IP packet may be used to approximately indicate where a specific ODU should be in sequence order, LLA 200-2 utilizes each sequence number 336 associated with each ODU of each respective IP packet to determine the final sequence of the associated packet descriptors in resequencing queue 548. LLA 200-2 re-sequences each ODUs of each IP packet received in the round robin order into re-sequence queue 548 in a re-sequenced placement order based on each sequence number 336 and timestamp 338 of each corresponding header of each of the IP packets. This allows time of day synchronizer 224 to remain at the micro-second level while the ODUs are transmitted in 10 s of nanosecond intervals. By utilizing smart queuing at the destination LLA 200-2 in the manner described above, LLC latency may be minimized, and the required amount of high speed memory required for resequencing queues may also be reduced.

Figure 6:
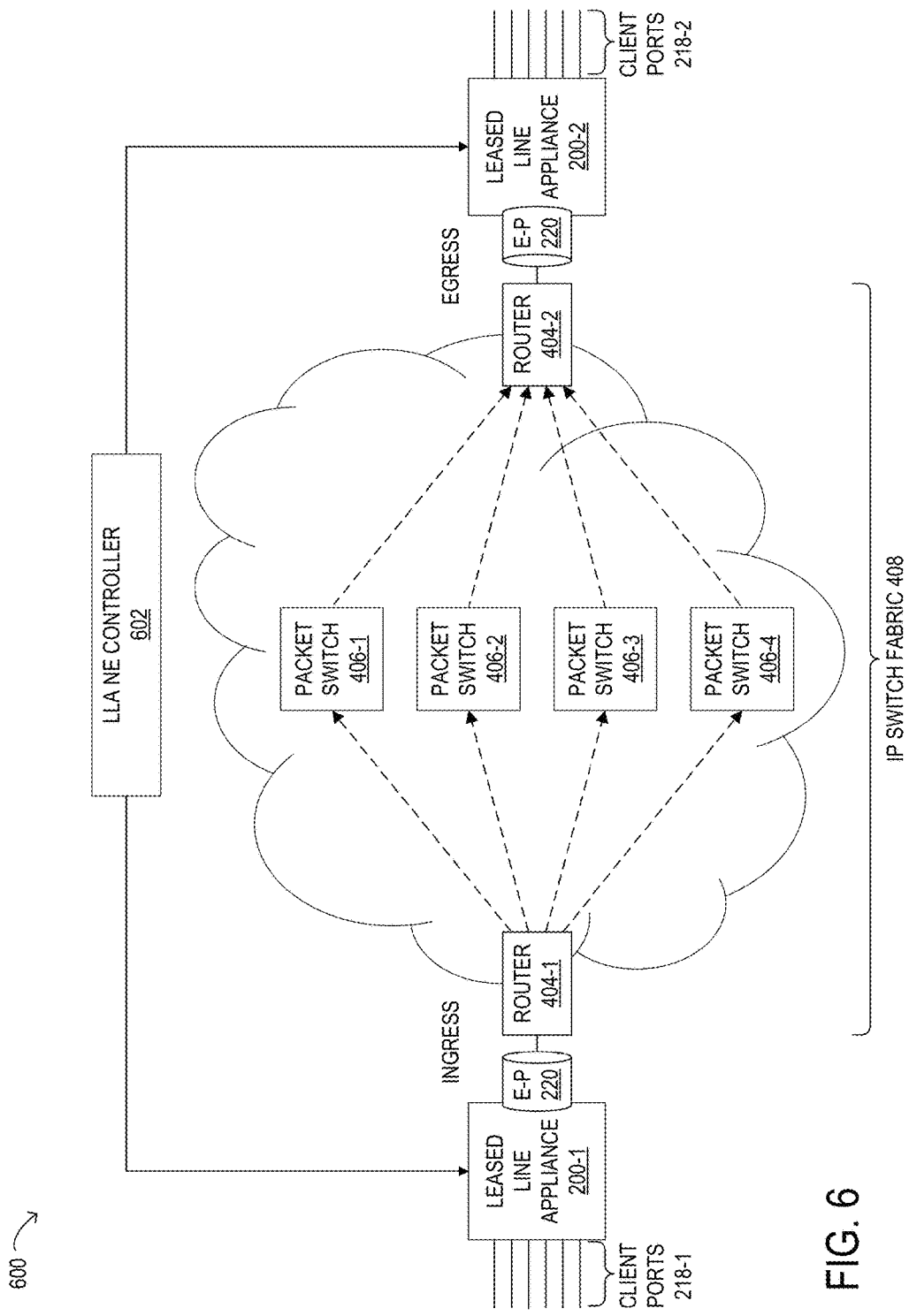
FIG. 6 is a block diagram of selected elements of an embodiment of a leased line appliance network switching system using switching fabrics.

Turning now to FIG. 6, a block diagram of selected elements of an embodiment of a leased line appliance network switching system 600 using IP switch fabric 408 is illustrated. FIG. 6 is a schematic diagram for descriptive purposes and is not drawn to scale or perspective.

LLA network switching system 600 may include, but is not limited to, a LLA network element (NE) controller 602, source/LLA 200-1, IP switch fabric 408, and a destination LLA 200-2. IP switch fabric 408 may include an ingress router 404-1, packet switches 406 including 406-1, 406-2, 406-3, and 406-4, and an egress router 404-2. In LLA network switching system 600, LLA 200-1 and LLA 200-2 may utilize RAIDS over UDP ports, as previously described. Routers 404-1 and 404-2 may utilized 5-Tuple look up and ECMP on 5-Tuple, as described above. LLA network switching system 600 may further comprise an ECMP over Core-Pod network. Frequency synchronization processes may be enabled to allow proper recovery of LLCs 232 and LLCs 234 at egress. ECMP based 5-Tuple packet header inspection may be enabled at network ingress of IP switch fabric 408. Since different UDP source port numbers and UDP destination port number are utilized to identify different lanes for RAIDS, EMCP will place ODU cell streams from different UDP ports into different ECMP paths for transmission of IP packets over IP switch fabric 408. DSCP 320 bits of IP protocol header 302 are used to convey that those transparent transport needs to have a high priority traffic class to avoid delays and jitter in IP switch fabric 408, which may comprise an IP/MPLS network.

Figure 7:
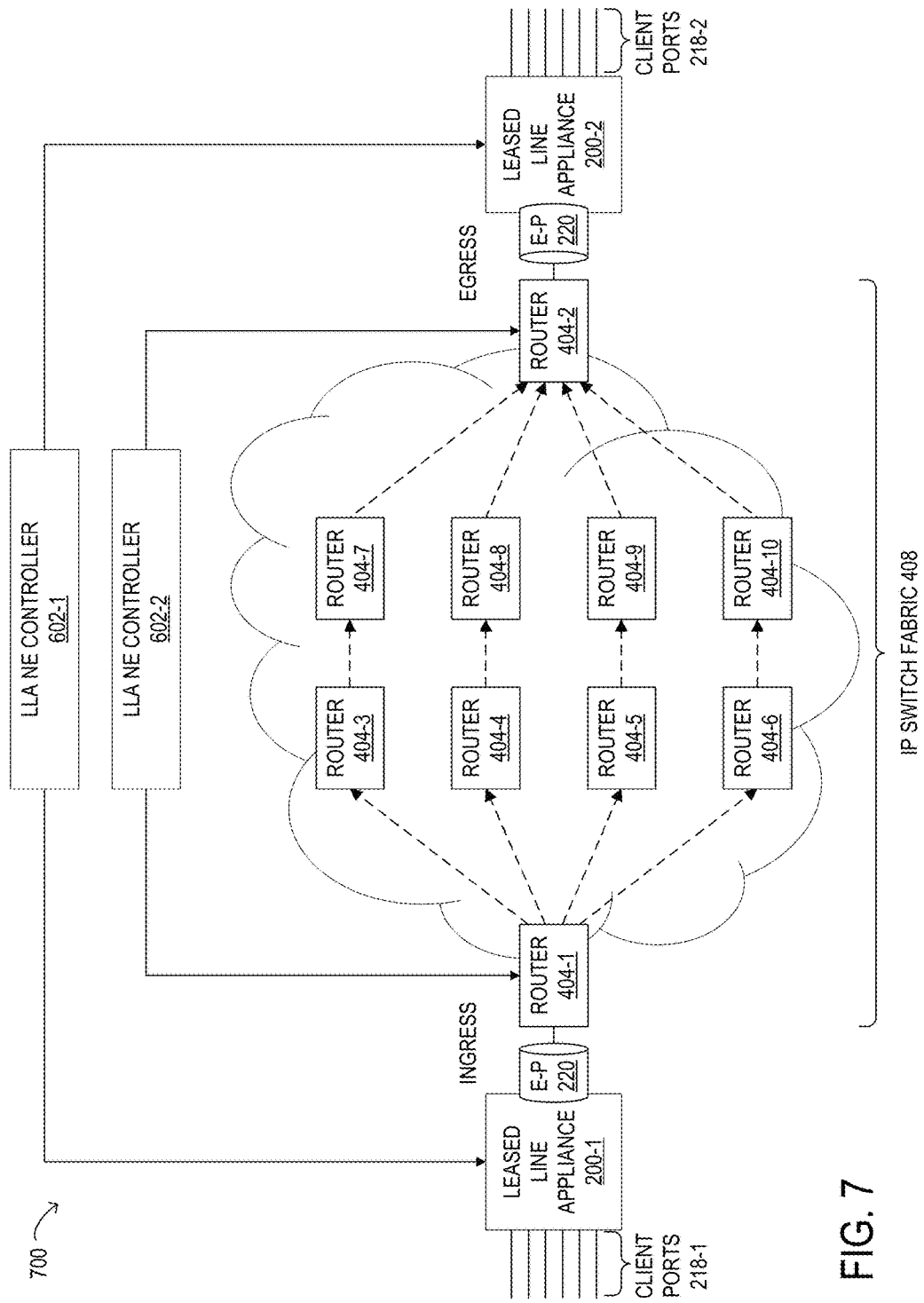
FIG. 7 is a block diagram of selected elements of an embodiment of a leased line appliance network switching system using routers.

FIG. 7 is a block diagram of selected elements of an embodiment of a leased line appliance network switching system 700 using routers 404. FIG. 7 is a schematic diagram for descriptive purposes and is not drawn to scale or perspective.

LLA network switching system 700 may include, but is not limited to, a LLA NE controller 602-1, a LLA NE controller 602-1, LLA 200-1, IP switch fabric 408, and a destination LLA 200-2. IP switch fabric 408 may include an ingress router 404-1, routers 404 including ingress router 404-1, routers 404-2, 404-3, 404-4, 404-5, 404-6, 404-7, 404-8, 404-9, and 404-10, and egress router 404-2. In LLA network switching system 700, LLA 200-1 and LLA 200-2 may utilize RAIDS over UDP ports, as previously described. Ingress router 404-1 and egress router 404-2 may utilized 5-Tuple look up and ECMP on 5-Tuple, as described above. Frequency synchronization processes may be enabled to allow proper recovery of LLCs 232 and LLCs 234 at egress. ECMP based 5-Tuple packet header inspection may be enabled at network ingress of IP switch fabric 408. Since different UDP source port numbers and UDP destination port number are utilized to identify different lanes for RAIDS, EMCP will place ODU cell streams from different UDP ports into different ECMP paths for transmission of IP packets over IP switch fabric 408. The 5-Tuple inspection results may be used as entropy labels and pushed in the MPLS stack. Resource reservation protocol (RSVP) or other bandwidth allocation methods may be used to reserve adequate path bandwidths for each ECMP path. Specific clients may utilize various bandwidth reservation methods that best fit for the client's networks. LLA NE controllers 602-1 and 602-2 may be utilized for bandwidth reservation. DSCP 320 bits of IP protocol header 302 are used to convey that those transparent transport needs to have a high priority traffic class to avoid delays and jitter in IP switch fabric 408, which may comprise an IP/MPLS network.

Figure 8:
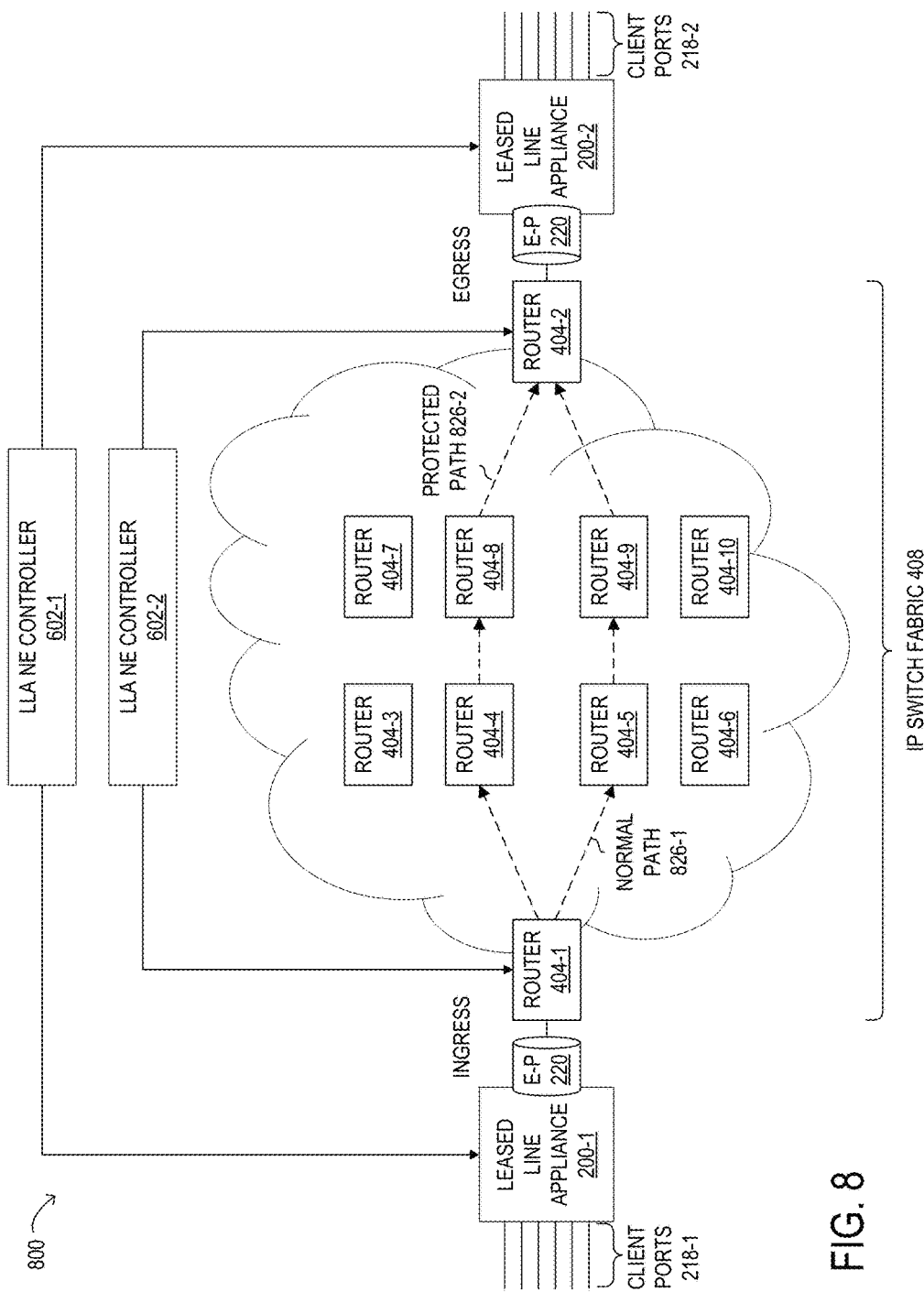
FIG. 8 is a block diagram of selected elements of an embodiment of a leased line appliance network switching system using routers.

FIG. 8 is a block diagram of selected elements of an embodiment of a leased line appliance network switching system 800 using routers 404. FIG. 8 is a schematic diagram for descriptive purposes and is not drawn to scale or perspective.

LLA network switching system 800 may include, but is not limited to, LLA NE controller 602-1, LLA NE controller 602-1, source LLA 200-1, IP switch fabric 408, and destination LLA 200-2. IP switch fabric 408 may include an ingress router 404-1, routers 404 including ingress router 404-1, routers 404-2, 404-3, 404-4, 404-5, 404-6, 404-7, 404-8, 404-9, and 404-10, and egress router 404-2. Ingress router 404-1 and egress router 404-2 may each comprise an IP/MPLS router. IP switch fabric 408 may comprise an MPLS router network with RSVP-traffic engineering (TE) enhancements. Frequency synchronization processes may be enabled to allow proper recovery of LLCs 232 and LLCs 234 at egress. Through LLA NE controllers 602-1 and 602-2, ingress router 404-1 may reserve a normal path 826-1, a normal MPLS circuit, and a protected path 826-2, a protected MPLS circuit, through IP switch fabric 408, the IP/MPLS network, with new RSVP-TE enhancements such as RFC 7551. Both forward and backward paths of normal path 826-1 and protected path 826-2 may be co-routed. DSCP 320 bits of IP protocol header 302 may be used to convey that those transparent transport needs to have a high priority traffic class to avoid delays and jitter in IP switch fabric 408, which may comprise an IP/MPLS network. In LLA network switching system 800, RAIDS is not enabled and 5-Tuple look up based ECMP is not needed. However, ingress router 404-1 may still utilize the 5-Tuple information for other network switching purposes.

By leveraging 5 Tuple inspections based ECMP forwarding widely supported in IP/MPLS WAN networks and data center networks and utilizing a unique combination of UDP port numbers and RAIDS, as described above, in IP network communication, an LLA 200 may comprise a simple IP host. In these LLA network switching systems, sophisticated MPLS routing, deep IP packet look up capabilities of existing routers and switches are not required. LLAs 200 are also enabled to use emerging Core-Pod IP over optical transport network (OTN) with 5G wireless core networks. The unique design of protocol fields and reassembly procedures (e.g. coarse ToD clocks+long sequence numbers), as described herein, allow the transport of very high speed leased line services (e.g. 400GE) with existing network frequency clocks (e.g. BITS). The latency measurement processes may reduce the amount of high speed memory requirements so that a design of a leased line appliance, as disclosed herein, can scale to future Terabit leased line services over "lousy" networks with large variations of latency and/or take advantage of future massive ECMP environments in metro.

Figure 9:
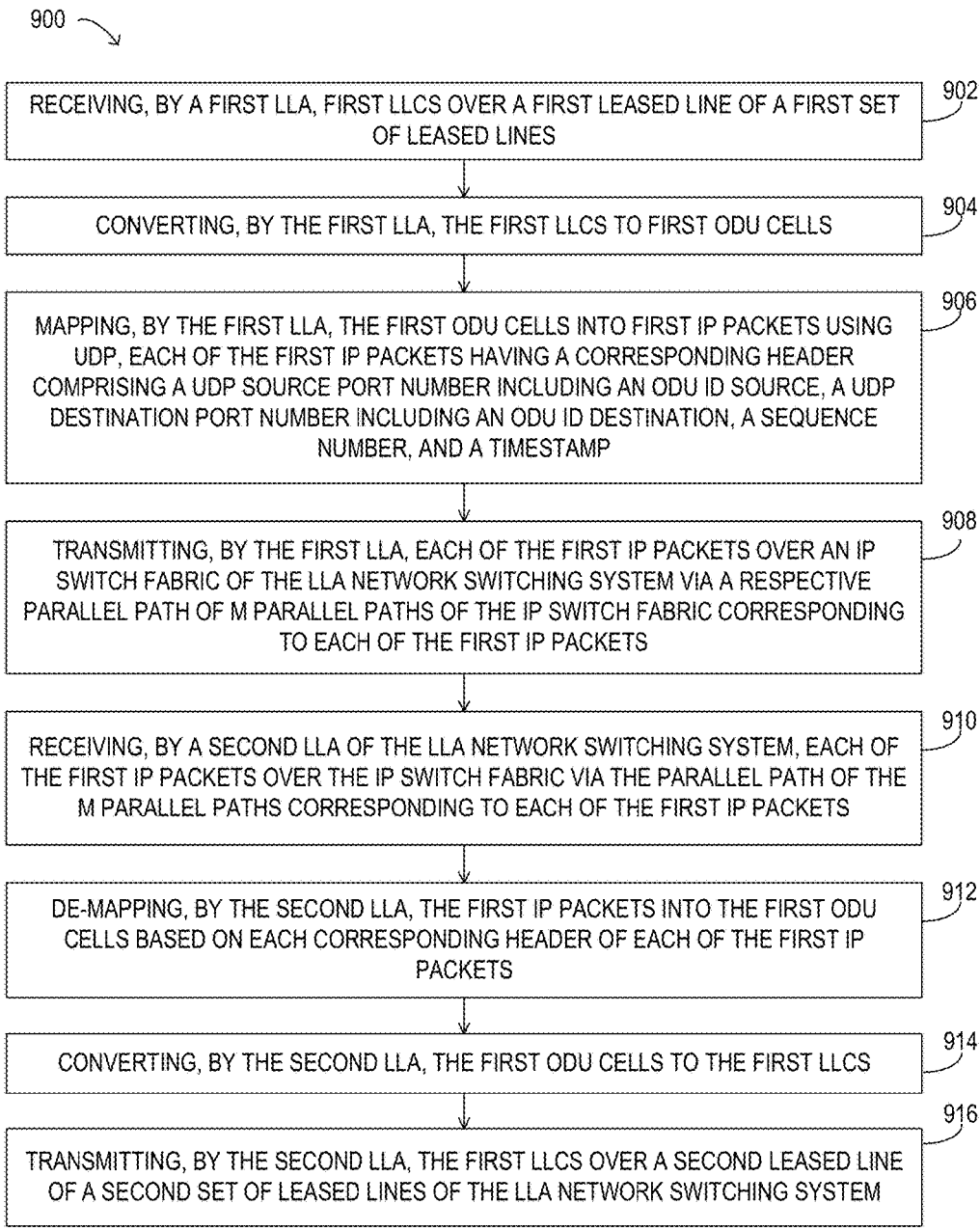
FIG. 9 is a flowchart of selected elements of an embodiment of a method for carrying bit transparent leased line services over IP/MPLS networks.

Referring now to FIG. 9, a flowchart of selected elements of an embodiment of a method 900 for carrying bit transparent leased line services over IP/MPLS networks, as described herein, is depicted. In various embodiments, method 900 may be performed using LLA appliances 200, LLA network switching systems 400, 600, 700, and 800, previously described with reference to FIGS. 2, 4, 6, 7, and 8, or another type of LLA network switching system. It is noted that certain operations described in method 900 may be optional or may be rearranged in different embodiments.

Method 900 may begin at step 902 by receiving, by a first LLA of a LLA network switching system, first LLCs over a first leased line of a first set of leased lines of the LLA network switching system. At step 904, converting, by the first LLA, the first LLCs to first optical data unit (ODU) cells. At step 906, mapping, by the first LLA, the first ODU cells into first Internet Protocol (IP) packets using user datagram protocol (UDP). Each of the first IP packets may have a corresponding header comprising a UDP source port number including an ODU identification (ID) source, a UDP destination port number including an ODU ID destination, a sequence number, and a timestamp. At step 908, transmitting, by the first LLA, each of the first IP packets over an IP switch fabric of the LLA network switching system via a respective parallel path of M parallel paths of the IP switch fabric corresponding to each of the first IP packets. At step 910, receiving, by a second LLA of the LLA network switching system, each of the first IP packets over the IP switch fabric via the parallel path of the M parallel paths corresponding to each of the first IP packets. At step 912, de-mapping, by the second LLA, the first IP packets into the first ODU cells based on each corresponding header of each of the first IP packets. At step 914, converting, by the second LLA, the first ODU cells to the first LLCs. At step 916, transmitting, by the second LLA, the first LLCs over a second leased line of a second set of leased lines of the LLA network switching system.

As disclosed herein, methods and systems of a leased line appliance (LLA) network switching system that includes using LLAs for leased line circuits (LLCs) to Internet Protocol (IP) transceiving, IP to LLCs transceiving, and an IP switch fabric having multiple parallel paths as a switching/routing network are disclosed. Each of the LLAs at the edge of the IP switch fabric may perform LLC to IP packet assembly procedures, may perform IP packet to LLC re-assembly procedures, and may utilize the protocol fields of the IP packet header of the IP packet for IP packet transport, which may enable the transport of very high speed leased line services to be carried over an IP/MPLS network using the IP switch fabric.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A leased line appliance (LLA) network switching system comprising:
   an Internet Protocol (IP) switch fabric including M parallel paths;
   a first LLA coupled to a first set of leased lines and coupled to the IP switch fabric to:
     receive first leased line circuits (LLCs) over a first leased line of the first set of leased lines;
     convert the first LLCs to first optical data unit (ODU) cells;
     map the first ODU cells into first Internet Protocol (IP) packets using user datagram protocol (UDP), each of the first IP packets having a corresponding header comprising a UDP source port number including a PCS code block ID source, a UDP destination port number including a PCS code block ID destination, a sequence number, and a timestamp; and
     transmit each of the first IP packets over the IP switch fabric via a respective parallel path of the M parallel paths corresponding to each of the first IP packets; and
   a second LLA coupled to a second set of leased lines and coupled to the IP switch fabric to:
     receive each of the first IP packets over the IP switch fabric via the parallel path of the M parallel paths corresponding to each of the first IP packets;
     de-map the first IP packets into the first ODU cells based on each corresponding header of each of the first IP packets;
     convert the first ODU cells to the first LLCs; and
     transmit the first LLCs over a second leased line of the second set of leased lines.

2. The LLA network switching system of claim 1, wherein the first LLA further to:
   receive second LLCs over a third leased line of the first set of leased lines;
   convert the second LLCs to second physical coding sublayer (PCS) blocks;
   map the second PCS code blocks into second IP packets using UDP, each of the second IP packets having a corresponding header comprising a UDP source port number including a PCS code block ID source, a UDP destination port number including a PCS code block ID destination, a sequence number, and a timestamp; and
   transmit each of the second IP packets over the IP switch fabric via the parallel path of the M parallel paths corresponding to each of the second IP packets, and wherein
   the second LLA further to:
     receive each of the second IP packets over the IP switch fabric via the parallel path of the M parallel paths corresponding to each of the second IP packets;
     de-map the second IP packets into the second PCS code blocks based on each corresponding header of each of the second IP packets;
     convert the second ODU cells to the second LLCs; and
     transmit the second LLCs over a fourth leased line of the second set of leased lines.

3. The LLA network switching system of claim 1, wherein the first LLA further to:
   receive third LLCs over a fifth leased line of the first set of leased lines;
   multiplex the third LLCs into third synchronous transport signal (STS) circuits;
   convert the third STS circuits to third ODU cells;
   map the third ODU cells into third IP packets using UDP, each of the third IP packets having a corresponding header comprising a UDP source port number including a PCS code block ID source, a UDP destination port number including a PCS code block ID destination, a sequence number, and a timestamp; and
   transmit each of the third IP packets over the IP switch fabric via the parallel path of the M parallel paths corresponding to each of the third IP packets, and wherein
   the second LLA further to:
     receive each of the third IP packets over the IP switch fabric via the parallel path of the M parallel paths corresponding to each of the third IP packets;
     de-map the third IP packets into the third ODU cells based on each corresponding header of each of the third IP packets;
     convert the third ODU cells to the third STS circuits;
     de-multiplex the third STS circuits into third LLCs; and
     transmit the third LLCs over a sixth leased line of the second set of leased lines.

4. The LLA network switching system of claim 1, wherein the first LLA further to:
   prior to the transmission of each of the first IP packets over the IP switch fabric,
     generate parity information for the first ODU cells in every M−1 IP packets of the first IP packets using exclusive or (XOR) operations that is included in a corresponding Mth IP packet of the first IP packets to utilize 1:(M−1) path protection, wherein the UDP source port number of the corresponding header of each of the first IP packets further comprising a parallel path number associated with a parallel path of the M parallel paths, and wherein
   the second LLA further to:
     prior to the de-map of the first IP packets into the first ODU cells, utilize 1:(M−1) path protection to:
       determine whether the M−1 IP packets of the first IP packets and the Mth IP packet of the first IP packets including the parity information for the first ODU cells have been received; and when only M−2 IP packets of the first IP packets and the Mth IP packet of the first IP packets have been received, recover a lost IP packet of the M−1 IP packets from the M−2 IP packets and the parity information received using XOR operations.

5. The LLA network switching system of claim 1, wherein the first LLA further to:
  perform a time of day synchronization process to synchronize a first time of day clock of the first LLA with an Internet time of day clock of the LLA network switching system; and
  prior to the transmission of each of the first IP packets over the IP switch fabric:
    adjust the timestamp of the corresponding header of each of the first IP packets based on the synchronized first time of day clock, and wherein
  the second LLA further to:
  perform the time of day synchronization process to synchronize a second time of day clock of the second LLA with the Internet time of day clock of the LLA network switching system.

6. The LLA network switching system of claim 1, wherein the first LLA further to:
  perform a time of day synchronization process to synchronize a first time of day clock of the first LLA with an Internet time of day clock of the LLA network switching system; and
  prior to the transmission of each of the first IP packets over the IP switch fabric:
    set each of first path latency measurements based on the first time of day clock;
    transmit each of the first path latency measurements to the second LLA via a respective one of the M parallel paths of the IP switch fabric; and
    receive a round robin order of M parallel path queues from the second LLA, each of the M parallel path queues corresponding to the respective one of the M parallel paths, wherein the transmission of each of the first IP packets over the IP switch fabric is further based on the round robin order of the M parallel path queues, and wherein
  the second LLA further to:
  perform the time of day synchronization process to synchronize a second time of day clock of the second LLA with the Internet time of day clock of the LLA network switching system;
  determine a low 10 time value and a high 90 time value of each respective one of the M parallel paths based on the first path latency measurements and the second time of day clock;
  sort the M parallel path queues in the round robin order of the low 10 time value of each respective one of the M parallel paths with the lowest low 10 time value being the first in the round robin order;
  set a watermark time value for the M parallel path queues as the highest high 90 time value of each respective one of the M parallel paths; and
  transmit the round robin order of the M parallel path queues to the first LLA.

7. The LLA network switching system of claim 6, wherein the reception of each of the first IP packets over the IP switch fabric is further based on the round robin order of the M parallel path queues, and wherein
the second LLA further to:
  prior to the de-map of the first IP packets into the first ODU cells, re-sequence each of the first IP packets received in the round robin order into a re-sequence queue in a re-sequenced placement order based on each sequence number and timestamp of each corresponding header of each of the first IP packets, wherein the de-map of the first IP packets are de-mapped in the re-sequenced order.

8. The LLA network switching system of claim 7, wherein the watermark time value is used to begin the re-sequence of each of the first IP packets received in the round robin order into the re-sequence queue.

9. The LLA network switching system of claim 1, wherein the first LLA further to:
  when a confirmation that one of the M parallel paths failed is received, utilize 1:(M−2) path protection and the M−1 working parallel paths for IP packet transmission and IP packet reception, and wherein
  the second LLA further to:
  when the confirmation that one of the M parallel paths failed is received, utilize 1:(M−2) path protection and the M−1 working parallel paths for IP packet transmission and IP packet reception.

10. The LLA network switching system of claim 1, wherein a protocol of UDP, a IP source address, a IP destination address, the UDP source port number, and the UDP destination port number of the corresponding header of each of the first IP packets enables 5-Tuple inspection based equal cost multi-path (ECMP) routing over the IP switch fabric.

11. A method comprising:
  receiving, by a first leased line appliance (LLA) of a LLA network switching system, first leased line circuits (LLCs) over a first leased line of a first set of leased lines of the LLA network switching system;
  converting, by the first LLA, the first LLCs to first optical data unit (ODU) cells;
  mapping, by the first LLA, the first ODU cells into first Internet Protocol (IP) packets using user datagram protocol (UDP), each of the first IP packets having a corresponding header comprising a UDP source port number including an ODU identification (ID) source, a UDP destination port number including an ODU ID destination, a sequence number, and a timestamp;
  transmitting, by the first LLA, each of the first IP packets over an IP switch fabric of the LLA network switching system via a respective parallel path of M parallel paths of the IP switch fabric corresponding to each of the first IP packets;
  receiving, by a second LLA of the LLA network switching system, each of the first IP packets over the IP switch fabric via the parallel path of the M parallel paths corresponding to each of the first IP packets;
  de-mapping, by the second LLA, the first IP packets into the first ODU cells based on each corresponding header of each of the first IP packets;
  converting, by the second LLA, the first ODU cells to the first LLCs; and
  transmitting, by the second LLA, the first LLCs over a second leased line of a second set of leased lines of the LLA network switching system.

12. The method of claim 11, the method further comprising:
  receiving, by the first LLA, second LLCs over a third leased line of the first set of leased lines;
  converting, by the first LLA, the second LLCs to second physical coding sublayer (PCS) blocks;
  mapping, by the first LLA, the second PCS code blocks into second IP packets using UDP, each of the second IP packets having a corresponding header comprising a UDP source port number including a PCS code block ID source, a UDP destination port number including a PCS code block ID destination, a sequence number, and a timestamp;

transmitting, by the first LLA, each of the second IP packets over the IP switch fabric via the parallel path of the M parallel paths corresponding to each of the second IP packets;

receiving, by the second LLA, each of the second IP packets over the IP switch fabric via the parallel path of the M parallel paths corresponding to each of the second IP packets;

de-mapping, by the second LLA, the second IP packets into the second PCS code blocks based on each corresponding header of each of the second IP packets;

converting, by the second LLA, the second ODU cells to the second LLCs; and transmitting, by the second LLA, the second LLCs over a fourth leased line of the second set of leased lines.

13. The method of claim 11, the method further comprising:

receiving, by the first LLA, third LLCs over a fifth leased line of the first set of leased lines;

multiplexing, by the first LLA, the third LLCs into third synchronous transport signal (STS) circuits;

converting, by the first LLA, the third STS circuits to third ODU cells;

mapping, by the first LLA, the third ODU cells into third IP packets using UDP, each of the third IP packets having a corresponding header comprising a UDP source port number including a PCS code block ID source, a UDP destination port number including a PCS code block ID destination, a sequence number, and a timestamp;

transmitting, by the first LLA, each of the third IP packets over the IP switch fabric via the parallel path of the M parallel paths corresponding to each of the third IP packets;

receiving, by the second LLA, each of the third IP packets over the IP switch fabric via the parallel path of the M parallel paths corresponding to each of the third IP packets;

de-mapping, by the second LLA, the third IP packets into the third ODU cells based on each corresponding header of each of the third IP packets;

converting, by the second LLA, the third ODU cells to the third STS circuits;

de-multiplexing, by the second LLA, the third STS circuits into third LLCs; and transmitting, by the second LLA, the third LLCs over a sixth leased line of the second set of leased lines.

14. The method of claim 11, the method further comprising:

prior to transmitting each of the first IP packets over the IP switch fabric, generating, by the first LLA utilizing 1:(M-1) path protection, parity information for the first ODU cells in every M-1 IP packets of the first IP packets using exclusive or (XOR) operations that is included in a corresponding Mth IP packet of the first IP packets, wherein the UDP source port number of the corresponding header of each of the first IP packets further comprising a parallel path number associated with a parallel path of the M parallel paths; and prior to de-mapping the first IP packets into the first ODU cells:

determining, by the second LLA utilizing 1:(M-1) path protection, whether the M-1 IP packets of the first IP packets and the Mth IP packet of the first IP packets including the parity information for the first ODU cells have been received; and when only M-2 IP packets of the first IP packets and the Mth IP packet of the first IP packets have been received, recovering, by the second LLA, a lost IP packet of the M-1 IP packets from the M-2 IP packets and the parity information received using XOR operations.

15. The method of claim 11, the method further comprising:

performing, by the first LLA, a time of day synchronization process to synchronize a first time of day clock of the first LLA with an Internet time of day clock of the LLA network switching system;

prior to transmitting each of the first IP packets over the IP switch fabric, adjusting, by the first LLA, the timestamp of the corresponding header of each of the first IP packets based on the synchronized first time of day clock; and performing, by the second LLA, the time of day synchronization process to synchronize a second time of day clock of the second LLA with the Internet time of day clock.

16. The method of claim 11, the method further comprising:

performing, by the first LLA, a time of day synchronization process to synchronize a first time of day clock of the first LLA with an Internet time of day clock of the LLA network switching system;

prior to transmitting each of the first IP packets over the IP switch fabric:

setting, by the first LLA, each of first path latency measurements based on the first time of day clock;

transmitting, by the first LLA, each of the first path latency measurements to the second LLA via a respective one of the M parallel paths of the IP switch fabric; and receiving, by the first LLA, a round robin order of M parallel path queues of the second LLA from the second LLA, each of the M parallel path queues corresponding to the respective one of the M parallel paths, wherein transmitting each of the first IP packets over the IP switch fabric is further based on the round robin order of the M parallel path queues;

performing, by the second LLA, the time of day synchronization process to synchronize a second time of day clock of the second LLA with the Internet time of day clock of the LLA network switching system;

determining, by the second LLA, a low 10 time value and a high 90 time value of each respective one of the M parallel paths based on the first path latency measurements and the second time of day clock;

sorting, by the second LLA, the M parallel path queues in the round robin order of the low 10 time value of each respective one of the M parallel paths with the lowest low 10 time value being the first in the round robin order;

setting, by the second LLA, a watermark time value for the M parallel path queues as the highest high 90 time value of each respective one of the M parallel paths; and transmitting, by the second LLA, the round robin order of the M parallel path queues to the first LLA.

17. The method of claim 16, wherein receiving each of the first IP packets over the IP switch fabric is further based on the round robin order of the M parallel path queues, wherein prior to de-mapping the first IP packets into the first ODU cells, re-sequencing, by the second LLA, each of the first IP packets received in the round robin order into a re-sequence queue in a re-sequenced placement order based on each sequence number and timestamp of each corresponding header of each of the first IP packets, and wherein de-mapping the first IP packets is based on the re-sequenced order.

18. The method of claim 16, wherein the watermark time value is used to begin re-sequencing each of the first IP packets received in the round robin order into the re-sequence queue.

19. The method of claim 11, the method further comprising:
   when a confirmation that one of the M parallel paths failed is received, utilizing, by the first LLA, 1:(M−2) path protection and the M−1 working parallel paths for IP packet transmission and IP packet reception; and
   when the confirmation that one of the M parallel paths failed is received, utilizing, by the second LLA, 1:(M−2) path protection and the M−1 working parallel paths for transmitting IP packets and receiving IP packets.

20. The method of claim 11, wherein a protocol of UDP, a IP source address, a IP destination address, the UDP source port number, and the UDP destination port number of the corresponding header of each of the first IP packets enables 5-Tuple inspection based equal cost multi-path (ECMP) routing over the IP switch fabric.

* * * * *